United States Patent
Huttunen et al.

(10) Patent No.: US 9,648,656 B2
(45) Date of Patent: *May 9, 2017

(54) UNINTERRUPTED TRANSMISSION OF INTERNET PROTOCOL TRANSMISSIONS DURING ENDPOINT CHANGES

(71) Applicant: VOIP-PAL.COM, INC., Bellevue, WA (US)

(72) Inventors: Pentti Kalevi Huttunen, Vancouver (CA); Gavin Malcolm McMillan, Maple Ridge (CA)

(73) Assignee: VOIP-PAL.COM, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,872

(22) Filed: Jul. 17, 2015

(65) Prior Publication Data
US 2015/0327320 A1    Nov. 12, 2015

Related U.S. Application Data

(63) Continuation of application No. 14/092,831, filed on Nov. 27, 2013, now Pat. No. 9,154,417, which is a
(Continued)

(51) Int. Cl.
*H04J 3/08* (2006.01)
*H04W 76/04* (2009.01)
(Continued)

(52) U.S. Cl.
CPC ............ *H04W 76/045* (2013.01); *H04B 7/15* (2013.01); *H04B 7/15592* (2013.01);
(Continued)

(58) Field of Classification Search
CPC ..................................................... H04L 12/66
See application file for complete search history.

(56) References Cited

U.S. PATENT DOCUMENTS 4,747,124 A    5/1988  Ladd
4,916,491 A    4/1990  Katoh
(Continued)

FOREIGN PATENT DOCUMENTS

BR    PI 0718312-7 A2    11/2013
BR    PI 0719682-2 A2    1/2014
(Continued)

OTHER PUBLICATIONS

Abrazhevich, Dennis. "Electronic Payment Systems: a User-Centered Perspective and Interaction Design," *Thesis under the auspices of the J.F. Schouten School for User-System Interaction Research*, Technische Universiteit Eindhoven, Netherlands, 2004, pp. Cover page-p. 189.

(Continued)

*Primary Examiner* — Hassan Kizou
*Assistant Examiner* — Abdullahi Ahmed
(74) *Attorney, Agent, or Firm* — Knobbe Martens Olson & Bear LLP

(57) ABSTRACT

Facilitating uninterrupted transmission of internet protocol (IP) transmissions during endpoint changes is disclosed. When an IP transmission is received at a first relay port or a second relay port, a call record having the first relay port identifier or the second relay port identifier matching a destination port identifier in the IP transmission is located. When the destination port identifier matches the first relay port identifier of the record, a source IP address identifier and a source port identifier from the IP transmission are set as a first entity IP address identifier and first entity port identifier, respectively, of the record when the first entity IP address identifier and first entity port identifier do not match the source IP address identifier and source port identifier respectively and a received IP session identifier in the IP transmission matches the first entity session identifier. A (Continued)

similar procedure is followed to set a second entity IP address identifier and port identifier.

20 Claims, 6 Drawing Sheets

Related U.S. Application Data continuation of application No. 13/496,864, filed as application No. PCT/CA2009/001317 on Sep. 17, 2009, now Pat. No. 8,675,566.

(51) Int. Cl.
  *H04B 7/155* (2006.01)
  *H04L 29/12* (2006.01)
  *H04L 12/66* (2006.01)
  *H04W 76/02* (2009.01)
  *H04L 29/06* (2006.01)
  *H04B 7/15* (2006.01)
  *H04L 12/741* (2013.01)

(52) U.S. Cl.
  CPC .............. *H04L 12/66* (2013.01); *H04L 45/74* (2013.01); *H04L 61/2007* (2013.01); *H04L 65/1006* (2013.01); *H04L 65/608* (2013.01); *H04W 76/021* (2013.01); *H04W 76/041* (2013.01)

(56) References Cited

U.S. PATENT DOCUMENTS

| | | |
|---|---|---|
| 4,992,971 A | 2/1991 | Hayashi |
| 5,146,491 A | 9/1992 | Silver et al. |
| 5,247,571 A | 9/1993 | Kay et al. |
| 5,303,297 A | 4/1994 | Hillis |
| 5,325,421 A | 6/1994 | Hou et al. |
| 5,359,642 A | 10/1994 | Castro |
| 5,425,085 A | 6/1995 | Weinberger et al. |
| 5,440,621 A | 8/1995 | Castro |
| 5,454,030 A | 9/1995 | de Oliveira et al. |
| 5,469,497 A | 11/1995 | Pierce et al. |
| 5,506,893 A | 4/1996 | Buscher et al. |
| 5,519,769 A | 5/1996 | Weinberger et al. |
| 5,559,871 A | 9/1996 | Smith |
| 5,590,133 A | 12/1996 | Billstrom et al. |
| 5,608,786 A | 3/1997 | Gordon |
| 5,621,787 A | 4/1997 | McKoy et al. |
| 5,633,913 A | 5/1997 | Talarmo |
| 5,661,790 A | 8/1997 | Hsu |
| 5,677,955 A | 10/1997 | Doggett et al. |
| 5,712,907 A | 1/1998 | Wegner et al. |
| 5,719,926 A | 2/1998 | Hill |
| 5,722,067 A | 2/1998 | Fougnies et al. |
| 5,724,355 A | 3/1998 | Bruno et al. |
| 5,726,984 A | 3/1998 | Kubler et al. |
| 5,737,414 A | 4/1998 | Walker et al. |
| 5,742,596 A | 4/1998 | Baratz et al. |
| 5,751,961 A | 5/1998 | Smyk |
| 5,793,762 A | 8/1998 | Penners et al. |
| 5,799,072 A | 8/1998 | Vulcan et al. |
| 5,802,502 A | 9/1998 | Gell et al. |
| 5,825,863 A | 10/1998 | Walker |
| 5,828,740 A | 10/1998 | Khuc et al. |
| 5,838,682 A | 11/1998 | Dekelbaum et al. |
| 5,845,267 A | 12/1998 | Ronen |
| 5,850,433 A | 12/1998 | Rondeau |
| 5,864,610 A | 1/1999 | Ronen |
| 5,867,495 A | 2/1999 | Elliott et al. |
| 5,883,810 A | 3/1999 | Franklin et al. |
| 5,883,891 A | 3/1999 | Williams et al. |
| 5,889,774 A | 3/1999 | Mirashrafi et al. |
| 5,905,736 A | 5/1999 | Ronen et al. |
| 5,907,547 A | 5/1999 | Foladare et al. |
| 5,910,946 A | 6/1999 | Csapo |
| 5,915,005 A | 6/1999 | He |
| 5,915,093 A | 6/1999 | Berlin et al. |
| 5,917,899 A | 6/1999 | Moss et al. |
| 5,923,659 A | 7/1999 | Curry et al. |
| 5,930,343 A | 7/1999 | Vasquez |
| 5,937,045 A | 8/1999 | Yaoya et al. |
| 5,940,598 A | 8/1999 | Strauss et al. |
| 5,953,504 A | 9/1999 | Sokal et al. |
| 5,956,391 A | 9/1999 | Melen et al. |
| 5,970,477 A | 10/1999 | Roden |
| 5,974,043 A | 10/1999 | Solomon |
| 5,991,291 A | 11/1999 | Asai et al. |
| 5,991,378 A | 11/1999 | Apel |
| 6,005,870 A | 12/1999 | Leung et al. |
| 6,005,926 A | 12/1999 | Mashinsky |
| 6,014,379 A | 1/2000 | White et al. |
| 6,021,126 A | 2/2000 | White et al. |
| 6,029,062 A | 2/2000 | Hanson |
| 6,052,445 A | 4/2000 | Bashoura et al. |
| 6,058,300 A | 5/2000 | Hanson |
| 6,069,890 A | 5/2000 | White et al. |
| 6,073,013 A | 6/2000 | Agre et al. |
| 6,078,647 A | 6/2000 | D'Eletto |
| 6,104,704 A | 8/2000 | Buhler et al. |
| 6,104,711 A | 8/2000 | Voit |
| 6,115,737 A | 9/2000 | Ely et al. |
| 6,128,304 A | 10/2000 | Gardell et al. |
| 6,137,869 A | 10/2000 | Voit et al. |
| 6,141,404 A | 10/2000 | Westerlage et al. |
| 6,151,385 A | 11/2000 | Reich et al. |
| 6,173,272 B1 | 1/2001 | Thomas et al. |
| 6,188,752 B1 | 2/2001 | Lesley |
| 6,243,689 B1 | 6/2001 | Norton |
| 6,249,573 B1 | 6/2001 | Hudson |
| 6,282,574 B1 | 8/2001 | Voit |
| 6,298,062 B1 | 10/2001 | Gardell et al. |
| 6,327,351 B1 | 12/2001 | Walker et al. |
| 6,351,464 B1 | 2/2002 | Galvin et al. |
| 6,359,880 B1 | 3/2002 | Curry et al. |
| 6,430,275 B1 | 8/2002 | Voit et al. |
| 6,434,143 B1 | 8/2002 | Donovan |
| 6,445,694 B1 | 9/2002 | Swartz |
| 6,507,644 B1 | 1/2003 | Henderson et al. |
| 6,553,025 B1 | 4/2003 | Kung et al. |
| 6,560,224 B1 | 5/2003 | Kung et al. |
| 6,574,328 B1 | 6/2003 | Wood et al. |
| 6,597,686 B1 | 7/2003 | Smyk |
| 6,597,783 B1 | 7/2003 | Tada et al. |
| 6,603,977 B1 | 8/2003 | Walsh et al. |
| 6,636,833 B1 | 10/2003 | Flitcroft et al. |
| 6,650,641 B1 | 11/2003 | Albert et al. |
| 6,674,745 B1 | 1/2004 | Schuster et al. |
| 6,724,860 B2 | 4/2004 | Stumer et al. |
| 6,744,858 B1 | 6/2004 | Ryan et al. |
| 6,766,159 B2 | 7/2004 | Lindholm |
| 6,772,188 B1 | 8/2004 | Cloutier |
| 6,775,534 B2 | 8/2004 | Lindgren et al. |
| 6,785,266 B2 | 8/2004 | Swartz |
| 6,798,767 B1 | 9/2004 | Alexander et al. |
| 6,819,929 B2 | 11/2004 | Antonucci et al. |
| 6,873,599 B1 | 3/2005 | Han |
| 6,892,184 B1 | 5/2005 | Komem et al. |
| 6,934,279 B1 | 8/2005 | Sollee et al. |
| 6,937,713 B1 | 8/2005 | Kung et al. |
| 6,947,531 B1 | 9/2005 | Lewis et al. |
| 6,954,453 B1 | 10/2005 | Schindler et al. |
| 6,961,334 B1 | 11/2005 | Kaczmarczyk |
| 6,963,557 B2 | 11/2005 | Knox |
| 6,963,739 B2 | 11/2005 | Dorenbosch et al. |
| 6,985,440 B1 | 1/2006 | Albert et al. |
| 6,993,015 B2 | 1/2006 | Kobayashi |
| 7,006,508 B2 | 2/2006 | Bondy et al. |
| 7,010,727 B1 | 3/2006 | Stucker |
| 7,027,564 B2 | 4/2006 | James |
| 7,042,985 B1 | 5/2006 | Wright |
| 7,046,658 B1 | 5/2006 | Kundaje |
| 7,051,072 B2 | 5/2006 | Stewart et al. |
| 7,055,174 B1 | 5/2006 | Cope et al. |

(56) References Cited

U.S. PATENT DOCUMENTS

| | | |
|---|---|---|
| 7,068,668 B2 | 6/2006 | Feuer |
| 7,068,772 B1 | 6/2006 | Widger et al. |
| 7,079,526 B1 | 7/2006 | Wipliez et al. |
| 7,120,682 B1 | 10/2006 | Salama |
| 7,151,772 B1 | 12/2006 | Kalmanek, Jr. et al. |
| 7,174,156 B1 | 2/2007 | Mangal |
| 7,177,399 B2 | 2/2007 | Dawson et al. |
| 7,203,478 B2 | 4/2007 | Benco et al. |
| 7,212,522 B1 | 5/2007 | Shankar et |
| 7,218,722 B1 | 5/2007 | Turner et al. |
| 7,277,528 B2 | 10/2007 | Rao et al. |
| 7,330,835 B2 | 2/2008 | Deggendorf |
| 7,366,157 B1 | 4/2008 | Valentine et al. |
| 7,400,881 B2 | 7/2008 | Kallio |
| 7,426,492 B1 | 9/2008 | Bishop et al. |
| 7,436,835 B2 | 10/2008 | Castleberry et al. |
| 7,437,665 B2 | 10/2008 | Perham |
| 7,440,442 B2 | 10/2008 | Grabelsky et al. |
| 7,447,707 B2 | 11/2008 | Gaurav et al. |
| 7,454,200 B2 | 11/2008 | Cai et al. |
| 7,454,510 B2 | 11/2008 | Kleyman et al. |
| 7,477,843 B1 | 1/2009 | Peeters et al. |
| 7,486,664 B2 | 2/2009 | Swartz |
| 7,486,667 B2 | 2/2009 | Feuer |
| 7,486,684 B2 | 2/2009 | Chu et al. |
| 7,512,117 B2 | 3/2009 | Swartz |
| 7,565,131 B2 | 7/2009 | Rollender |
| 7,573,982 B2 | 8/2009 | Breen et al. |
| 7,580,886 B1 | 8/2009 | Schulz |
| 7,587,036 B2 | 9/2009 | Wood et al. |
| 7,593,390 B2 | 9/2009 | Lebizay |
| 7,593,884 B2 | 9/2009 | Rothman et al. |
| 7,599,944 B2 | 10/2009 | Gaurav et al. |
| 7,639,792 B2 | 12/2009 | Qiu et al. |
| 7,644,037 B1 | 1/2010 | Ostrovsky |
| 7,647,500 B2 | 1/2010 | Machiraju et al. |
| 7,657,011 B1 | 2/2010 | Zielinski et al. |
| 7,664,495 B1 | 2/2010 | Bonner et al. |
| 7,676,215 B2 | 3/2010 | Chin et al. |
| 7,676,431 B2 | 3/2010 | O'Leary et al. |
| 7,680,114 B2 | 3/2010 | Yazaki et al. |
| 7,680,737 B2 | 3/2010 | Smith et al. |
| 7,702,308 B2 | 4/2010 | Rollender |
| 7,715,821 B2 | 5/2010 | Rollender |
| 7,734,544 B2 | 6/2010 | Schleicher |
| 7,738,384 B2 | 6/2010 | Pelletier |
| 7,764,777 B2 | 7/2010 | Wood et al. |
| 7,764,944 B2 | 7/2010 | Rollender |
| 7,765,261 B2 | 7/2010 | Kropivny |
| 7,765,266 B2 | 7/2010 | Kropivny |
| 7,774,711 B2 | 8/2010 | Valeski |
| 7,797,459 B1 | 9/2010 | Roy et al. |
| 7,882,011 B2 | 2/2011 | Sandhu et al. |
| 7,894,441 B2 | 2/2011 | Yazaki et al. |
| 7,899,742 B2 | 3/2011 | Benkert et al. |
| 7,907,551 B2 | 3/2011 | Croy et al. |
| 7,929,955 B1 | 4/2011 | Bonner |
| 7,944,909 B2 | 5/2011 | James |
| 7,950,046 B2 | 5/2011 | Kropivny |
| 7,958,233 B2 | 6/2011 | Gutierrez |
| 7,965,645 B2 | 6/2011 | Pelletier |
| 7,979,529 B2 | 7/2011 | Kreusch et al. |
| 7,995,589 B2 | 8/2011 | Sollee et al. |
| 8,024,785 B2 | 9/2011 | Andress et al. |
| 8,027,333 B2 | 9/2011 | Grabelsky et al. |
| 8,036,366 B2 | 10/2011 | Chu |
| 8,041,022 B1 | 10/2011 | Andreasen et al. |
| 8,050,273 B2 | 11/2011 | Gass |
| 8,060,887 B2 | 11/2011 | Kropivny |
| 8,078,164 B2 | 12/2011 | Ganesan |
| 8,111,690 B2 | 2/2012 | Hussain et al. |
| 8,116,307 B1 | 2/2012 | Thesayi et al. |
| 8,125,982 B2 | 2/2012 | Feuer |
| 8,127,005 B2 | 2/2012 | Gutierrez |
| 8,145,182 B2 | 3/2012 | Rudolf et al. |
| 8,161,078 B2 | 4/2012 | Gaurav et al. |
| 8,166,533 B2 | 4/2012 | Yuan |
| 8,166,547 B2 | 4/2012 | Bevan et al. |
| 8,189,568 B2 | 5/2012 | Qiu et al. |
| 8,190,739 B2 | 5/2012 | Gutierrez |
| 8,200,575 B2 | 6/2012 | Torres et al. |
| 8,204,044 B2 | 6/2012 | Lebizay |
| 8,219,115 B1 | 7/2012 | Nelissen |
| 8,223,927 B2 | 7/2012 | Di Serio et al. |
| 8,228,837 B2 | 7/2012 | Sheriff et al. |
| 8,228,897 B2 | 7/2012 | Mitchell |
| 8,243,730 B1 | 8/2012 | Wong et al. |
| 8,244,204 B1 | 8/2012 | Chen et al. |
| 8,275,404 B2 | 9/2012 | Berger et al. |
| 8,300,632 B2 | 10/2012 | Davis et al. |
| 8,306,063 B2 | 11/2012 | Erdal et al. |
| 8,315,521 B2 | 11/2012 | Leiden et al. |
| 8,363,647 B2 | 1/2013 | Fangman et al. |
| 8,364,172 B2 | 1/2013 | Guanfeng et al. |
| 8,396,445 B2 | 3/2013 | Crawford et al. |
| 8,410,907 B2 | 4/2013 | Twitchell, Jr. |
| 8,417,791 B1 | 4/2013 | Peretz et al. |
| 8,422,507 B2 | 4/2013 | Björsell et al. |
| 8,423,791 B1 | 4/2013 | Yu et al. |
| 8,427,981 B2 | 4/2013 | Wyss et al. |
| 8,437,340 B2 | 5/2013 | James |
| 8,462,915 B2 | 6/2013 | Breen et al. |
| 8,468,196 B1 | 6/2013 | Roskind et al. |
| 8,493,931 B1 | 7/2013 | Nix |
| 8,509,225 B2 | 8/2013 | Grabelsky et al. |
| 8,526,306 B2 | 9/2013 | Jungck et al. |
| 8,532,075 B2 | 9/2013 | Rassool et al. |
| 8,537,805 B2 | 9/2013 | Björsell et al. |
| 8,542,815 B2 | 9/2013 | Perreault et al. |
| 8,543,477 B2 | 9/2013 | Love et al. |
| 8,594,298 B2 | 11/2013 | Klein et al. |
| 8,599,747 B1 | 12/2013 | Saleem et al. |
| 8,599,837 B2 | 12/2013 | Kyle |
| 8,605,714 B2 | 12/2013 | Lebizay |
| 8,605,869 B1 | 12/2013 | Mobarak et al. |
| 8,607,323 B2 | 12/2013 | Yuan |
| 8,611,354 B2 | 12/2013 | Keränen et al. |
| 8,625,578 B2 | 1/2014 | Roy et al. |
| 8,627,211 B2 | 1/2014 | Kropivny |
| 8,630,234 B2 | 1/2014 | Björsell et al. |
| 8,634,838 B2 | 1/2014 | Hellwig et al. |
| 8,675,566 B2 * | 3/2014 | Huttunen ............... H04L 12/66 370/328 |
| 8,682,919 B1 | 3/2014 | Golliher |
| 8,702,505 B2 | 4/2014 | Kropivny |
| 8,713,098 B1 | 4/2014 | Adya et al. |
| 8,724,643 B2 | 5/2014 | Feuer |
| 8,749,610 B1 | 6/2014 | Gossweiler et al. |
| 8,750,290 B2 | 6/2014 | Vance et al. |
| 8,763,081 B2 | 6/2014 | Bogdanovic et al. |
| 8,767,717 B2 | 7/2014 | Siegel et al. |
| 8,768,951 B2 | 7/2014 | Crago |
| 8,774,171 B2 | 7/2014 | Mitchell |
| 8,774,378 B2 | 7/2014 | Björsell et al. |
| 8,774,721 B2 | 7/2014 | Hertel et al. |
| 8,780,703 B1 | 7/2014 | Eidelson et al. |
| 8,792,374 B1 | 7/2014 | Jain et al. |
| 8,792,905 B1 | 7/2014 | Li et al. |
| 8,804,705 B2 | 8/2014 | Fangman et al. |
| 8,805,345 B2 | 8/2014 | Ling et al. |
| 8,810,392 B1 | 8/2014 | Teller et al. |
| 8,819,566 B2 | 8/2014 | Mehin et al. |
| 8,837,360 B1 | 9/2014 | Mishra et al. |
| 8,838,539 B1 | 9/2014 | Ashcraft et al. |
| 8,848,887 B2 | 9/2014 | Willman |
| 8,862,701 B2 | 10/2014 | Havriluk |
| 8,885,609 B2 | 11/2014 | Nix |
| 8,903,051 B2 | 12/2014 | Li et al. |
| 8,903,360 B2 | 12/2014 | Celi, Jr. et al. |
| 8,909,556 B2 | 12/2014 | Huxham |
| 8,938,209 B2 | 1/2015 | Crawford et al. |
| 8,938,534 B2 | 1/2015 | Le et al. |
| 8,948,061 B2 | 2/2015 | Sridhar |
| 8,972,612 B2 | 3/2015 | Le et al. |

(56) References Cited

U.S. PATENT DOCUMENTS

| | | |
|---|---|---|
| 8,982,719 B2 | 3/2015 | Seetharaman et al. |
| 8,995,428 B2 | 3/2015 | Haster |
| 9,003,306 B2 | 4/2015 | Mehin et al. |
| 9,137,385 B2 | 9/2015 | Björsell et al. |
| 9,143,608 B2 | 9/2015 | Björsell et al. |
| 9,154,417 B2 * | 10/2015 | Huttunen .............. H04L 12/66 |
| 9,179,005 B2 | 11/2015 | Perreault et al. |
| 9,549,071 B2 | 1/2017 | Björsell et al. |
| 9,565,307 B2 | 2/2017 | Björsell et al. |
| 2001/0027478 A1 | 10/2001 | Meier et al. |
| 2001/0052081 A1 | 12/2001 | McKibben et al. |
| 2002/0002041 A1 | 1/2002 | Lindgren et al. |
| 2002/0018445 A1 | 2/2002 | Kobayashi |
| 2002/0051518 A1 | 5/2002 | Bondy et al. |
| 2002/0057764 A1 | 5/2002 | Salvucci et al. |
| 2002/0116464 A1 | 8/2002 | Mak |
| 2002/0122391 A1 | 9/2002 | Shalit |
| 2002/0141352 A1 | 10/2002 | Fangman et al. |
| 2002/0150080 A1 | 10/2002 | Bhattacharya et al. |
| 2003/0012196 A1 | 1/2003 | Ramakrishnan |
| 2003/0043974 A1 | 3/2003 | Emerson, III |
| 2003/0095539 A1 | 5/2003 | Feuer |
| 2003/0179747 A1 | 9/2003 | Pyke et al. |
| 2003/0200311 A1 | 10/2003 | Baum |
| 2003/0219103 A1 | 11/2003 | Rao et al. |
| 2004/0022237 A1 | 2/2004 | Elliott et al. |
| 2004/0034793 A1 | 2/2004 | Yuan |
| 2004/0157629 A1 | 8/2004 | Kallio et al. |
| 2004/0165709 A1 | 8/2004 | Pence et al. |
| 2004/0181599 A1 | 9/2004 | Kreusch et al. |
| 2004/0202295 A1 | 10/2004 | Shen et al. |
| 2004/0203565 A1 | 10/2004 | Chin et al. |
| 2004/0203582 A1 | 10/2004 | Dorenbosch et al. |
| 2004/0240439 A1 | 12/2004 | Castleberry et al. |
| 2004/0255126 A1 | 12/2004 | Reith |
| 2005/0007999 A1 | 1/2005 | Becker et al. |
| 2005/0025043 A1 | 2/2005 | Mussman et al. |
| 2005/0063519 A1 | 3/2005 | James |
| 2005/0069097 A1 | 3/2005 | Hanson et al. |
| 2005/0083911 A1 | 4/2005 | Grabelsky et al. |
| 2005/0094651 A1 | 5/2005 | Lutz et al. |
| 2005/0131813 A1 | 6/2005 | Gallagher et al. |
| 2005/0169248 A1 | 8/2005 | Truesdale et al. |
| 2005/0171898 A1 | 8/2005 | Bishop et al. |
| 2005/0174937 A1 | 8/2005 | Scoggins et al. |
| 2005/0177843 A1 | 8/2005 | Williams |
| 2005/0188081 A1 | 8/2005 | Gibson et al. |
| 2005/0190892 A1 | 9/2005 | Dawson et al. |
| 2005/0192897 A1 | 9/2005 | Rogers et al. |
| 2005/0192901 A1 | 9/2005 | McCoy et al. |
| 2005/0198499 A1 | 9/2005 | Salapaka et al. |
| 2005/0202799 A1 | 9/2005 | Rollender |
| 2005/0222952 A1 | 10/2005 | Garrett et al. |
| 2005/0267842 A1 | 12/2005 | Weichert et al. |
| 2005/0287979 A1 | 12/2005 | Rollender |
| 2006/0006224 A1 | 1/2006 | Modi |
| 2006/0007940 A1 | 1/2006 | Sollee et al. |
| 2006/0013266 A1 | 1/2006 | Vega-Garcia et al. |
| 2006/0030290 A1 | 2/2006 | Rudolf et al. |
| 2006/0036522 A1 | 2/2006 | Perham |
| 2006/0072547 A1 | 4/2006 | Florkey et al. |
| 2006/0072550 A1 | 4/2006 | Davis et al. |
| 2006/0078094 A1 | 4/2006 | Breen et al. |
| 2006/0093135 A1 | 5/2006 | Fiatal et al. |
| 2006/0095320 A1 | 5/2006 | Jones |
| 2006/0109960 A1 | 5/2006 | D'Evelyn et al. |
| 2006/0111116 A1 | 5/2006 | Palmer et al. |
| 2006/0116892 A1 | 6/2006 | Grimes et al. |
| 2006/0142011 A1 | 6/2006 | Kallio |
| 2006/0146797 A1 | 7/2006 | Lebizay |
| 2006/0153342 A1 | 7/2006 | Sasaki |
| 2006/0160565 A1 | 7/2006 | Singh et al. |
| 2006/0177035 A1 | 8/2006 | Cope et al. |
| 2006/0189303 A1 | 8/2006 | Rollender |
| 2006/0195398 A1 | 8/2006 | Dheer et al. |
| 2006/0195584 A1 | 8/2006 | Baumann |
| 2006/0205383 A1 | 9/2006 | Rollender |
| 2006/0209768 A1 | 9/2006 | Yan et al. |
| 2006/0233317 A1 | 10/2006 | Coster et al. |
| 2006/0248186 A1 | 11/2006 | Smith |
| 2006/0251056 A1 | 11/2006 | Feuer |
| 2006/0258328 A1 | 11/2006 | Godoy |
| 2006/0264200 A1 | 11/2006 | Laiho et al. |
| 2006/0268921 A1 | 11/2006 | Ekstrom et al. |
| 2006/0281437 A1 | 12/2006 | Cook |
| 2007/0016524 A1 | 1/2007 | Diveley et al. |
| 2007/0036139 A1 | 2/2007 | Patel et al. |
| 2007/0036143 A1 | 2/2007 | Alt et al. |
| 2007/0047548 A1 | 3/2007 | Yazaki et al. |
| 2007/0053382 A1 | 3/2007 | Bevan et al. |
| 2007/0064919 A1 | 3/2007 | Chen et al. |
| 2007/0092070 A1 | 4/2007 | Croy et al. |
| 2007/0112964 A1 | 5/2007 | Guedalia et al. |
| 2007/0115935 A1 | 5/2007 | Qiu et al. |
| 2007/0121590 A1 | 5/2007 | Turner et al. |
| 2007/0121593 A1 | 5/2007 | Vance et al. |
| 2007/0121602 A1 | 5/2007 | Sin et al. |
| 2007/0127676 A1 | 6/2007 | Khadri |
| 2007/0174469 A1 | 7/2007 | Andress et al. |
| 2007/0217354 A1 | 9/2007 | Buckley |
| 2007/0220038 A1 | 9/2007 | Crago |
| 2007/0253418 A1 | 11/2007 | Shiri et al. |
| 2007/0253429 A1 | 11/2007 | James |
| 2007/0263609 A1 | 11/2007 | Mitchell |
| 2007/0297376 A1 | 12/2007 | Gass |
| 2008/0013523 A1 | 1/2008 | Nambakkam |
| 2008/0037715 A1 | 2/2008 | Prozeniuk et al. |
| 2008/0056235 A1 | 3/2008 | Albina et al. |
| 2008/0056243 A1 | 3/2008 | Roy et al. |
| 2008/0056302 A1 | 3/2008 | Erdal et al. |
| 2008/0063153 A1 | 3/2008 | Krivorot et al. |
| 2008/0160953 A1 | 7/2008 | Mia et al. |
| 2008/0166999 A1 | 7/2008 | Guedalia et al. |
| 2008/0167019 A1 | 7/2008 | Guedalia et al. |
| 2008/0167020 A1 | 7/2008 | Guedalia et al. |
| 2008/0167039 A1 | 7/2008 | Guedalia et al. |
| 2008/0187122 A1 | 8/2008 | Baker |
| 2008/0188198 A1 | 8/2008 | Patel et al. |
| 2008/0188227 A1 | 8/2008 | Guedalia et al. |
| 2008/0205378 A1 | 8/2008 | Wyss et al. |
| 2008/0310599 A1 | 12/2008 | Purnadi et al. |
| 2009/0003535 A1 | 1/2009 | Grabelsky et al. |
| 2009/0017842 A1 | 1/2009 | Fukasaku |
| 2009/0028146 A1 | 1/2009 | Kleyman et al. |
| 2009/0129566 A1 | 5/2009 | Feuer |
| 2009/0135724 A1 | 5/2009 | Zhang et al. |
| 2009/0135735 A1 | 5/2009 | Zhang et al. |
| 2009/0141883 A1 | 6/2009 | Bastien |
| 2009/0213839 A1 | 8/2009 | Davis et al. |
| 2009/0214000 A1 | 8/2009 | Patel et al. |
| 2009/0238168 A1 | 9/2009 | Lavoie et al. |
| 2009/0268615 A1 | 10/2009 | Pelletier |
| 2009/0292539 A1 | 11/2009 | Jaroker |
| 2009/0296900 A1 | 12/2009 | Breen et al. |
| 2009/0325558 A1 | 12/2009 | Pridmore et al. |
| 2010/0002701 A1 | 1/2010 | Hsieh et al. |
| 2010/0008345 A1 | 1/2010 | Lebizay |
| 2010/0039946 A1 | 2/2010 | Imbimbo et al. |
| 2010/0083364 A1 | 4/2010 | Gutierrez |
| 2010/0086119 A1 | 4/2010 | De Luca et al. |
| 2010/0105379 A1 | 4/2010 | Bonner et al. |
| 2010/0114896 A1 | 5/2010 | Clark et al. |
| 2010/0115018 A1 | 5/2010 | Yoon et al. |
| 2010/0142382 A1 | 6/2010 | Jungck et al. |
| 2010/0150138 A1 | 6/2010 | Björsell et al. |
| 2010/0150328 A1 | 6/2010 | Perreault et al. |
| 2010/0172345 A1 | 7/2010 | Björsell et al. |
| 2010/0177671 A1 | 7/2010 | Qiu et al. |
| 2010/0220852 A1 | 9/2010 | Willman et al. |
| 2010/0233991 A1 | 9/2010 | Crawford et al. |
| 2010/0246589 A1 | 9/2010 | Pelletier |
| 2010/0272242 A1 | 10/2010 | Croy et al. |
| 2010/0278534 A1 | 11/2010 | Leiden et al. |
| 2010/0316195 A1 | 12/2010 | Di Serio et al. |

(56) References Cited

U.S. PATENT DOCUMENTS

| | | |
|---|---|---|
| 2011/0013541 A1 | 1/2011 | Croy et al. |
| 2011/0072095 A1 | 3/2011 | Havriluk |
| 2011/0122827 A1 | 5/2011 | Björsell et al. |
| 2011/0153809 A1 | 6/2011 | Ghanem et al. |
| 2011/0167164 A1 | 7/2011 | Gutierrez |
| 2011/0176541 A1 | 7/2011 | James |
| 2011/0201321 A1 | 8/2011 | Bonner |
| 2011/0208859 A1 | 8/2011 | Gutierrez |
| 2011/0235543 A1 | 9/2011 | Seetharaman et al. |
| 2011/0255553 A1 | 10/2011 | Bobba et al. |
| 2011/0261717 A1 | 10/2011 | Akuzuwa et al. |
| 2011/0267986 A1 | 11/2011 | Grabelsky et al. |
| 2011/0273526 A1 | 11/2011 | Mehin et al. |
| 2011/0276903 A1 | 11/2011 | Mehin et al. |
| 2011/0276904 A1 | 11/2011 | Mehin et al. |
| 2011/0292929 A1 | 12/2011 | Haster |
| 2012/0014383 A1 | 1/2012 | Geromel et al. |
| 2012/0089717 A1 | 4/2012 | Chen |
| 2012/0096145 A1 | 4/2012 | Le et al. |
| 2012/0099599 A1 | 4/2012 | Keränen et al. |
| 2012/0113981 A1 | 5/2012 | Feuer |
| 2012/0155333 A1 | 6/2012 | Yoon et al. |
| 2012/0170574 A1 | 7/2012 | Huttunen et al. |
| 2012/0195236 A1 | 8/2012 | Knight |
| 2012/0195415 A1 | 8/2012 | Wyss et al. |
| 2012/0227101 A1 | 9/2012 | Yuan |
| 2012/0250624 A1 | 10/2012 | Lebizay |
| 2012/0259975 A1 | 10/2012 | Le et al. |
| 2012/0270554 A1 | 10/2012 | Hellwig et al. |
| 2012/0282881 A1 | 11/2012 | Mitchell |
| 2012/0314699 A1 | 12/2012 | Qiu et al. |
| 2013/0039226 A1 | 2/2013 | Sridhar |
| 2013/0097308 A1 | 4/2013 | Le et al. |
| 2013/0114589 A1 | 5/2013 | Fangman et al. |
| 2013/0128879 A1 | 5/2013 | Kyle |
| 2013/0148549 A1 | 6/2013 | Crawford et al. |
| 2013/0173534 A1 | 7/2013 | Nelakonda et al. |
| 2013/0223276 A1 | 8/2013 | Padgett |
| 2013/0229950 A1 | 9/2013 | Björsell et al. |
| 2013/0237198 A1 | 9/2013 | Vashi et al. |
| 2013/0254301 A1 | 9/2013 | Lin et al. |
| 2013/0272297 A1 | 10/2013 | Breen et al. |
| 2013/0281147 A1 | 10/2013 | Denman et al. |
| 2013/0287006 A1 | 10/2013 | Nix |
| 2013/0310002 A1 | 11/2013 | Celi, Jr. et al. |
| 2013/0318166 A1 | 11/2013 | Jungck et al. |
| 2013/0329722 A1 | 12/2013 | Perrault et al. |
| 2013/0329864 A1 | 12/2013 | Björsell et al. |
| 2014/0010119 A1 | 1/2014 | Björsell et al. |
| 2014/0016764 A1 | 1/2014 | Björsell et al. |
| 2014/0024367 A1 | 1/2014 | Björsell et al. |
| 2014/0101749 A1 | 4/2014 | Yuan |
| 2014/0141884 A1 | 5/2014 | Kropivny |
| 2014/0153477 A1 | 6/2014 | Huttunen et al. |
| 2014/0211789 A1 | 7/2014 | Feuer |
| 2014/0215642 A1 | 7/2014 | Huxham |
| 2014/0220944 A1 | 8/2014 | Balasubramanian |
| 2014/0244393 A1 | 8/2014 | Rimmer et al. |
| 2014/0247730 A1 | 9/2014 | Thota et al. |
| 2014/0269624 A1 | 9/2014 | Khay-Ibbat et al. |
| 2014/0307858 A1 | 10/2014 | Li et al. |
| 2014/0321333 A1 | 10/2014 | Björsell et al. |
| 2014/0324969 A1 | 10/2014 | Riddle |
| 2014/0337961 A1 | 11/2014 | Chien et al. |
| 2014/0337962 A1 | 11/2014 | Brandstatter |
| 2014/0349602 A1 | 11/2014 | Majumdar et al. |
| 2015/0327320 A1 | 11/2015 | Huttunen et al. |
| 2015/0358470 A1 | 12/2015 | Björsell et al. |
| 2016/0006882 A1 | 1/2016 | Björsell et al. |
| 2016/0028619 A1 | 1/2016 | Perreault et al. |

FOREIGN PATENT DOCUMENTS

| | | |
|---|---|---|
| CA | 2 218 216 A1 | 10/1997 |
| CA | 2249668 A1 | 4/1999 |
| CA | 2 299 037 A1 | 8/2000 |
| CA | 2 437 275 A1 | 10/2002 |
| CA | 2598200 A1 | 2/2008 |
| CA | 2668025 A1 | 5/2008 |
| CA | 2670510 A1 | 6/2008 |
| CA | 2 681 984 A1 | 10/2008 |
| CA | 2 690 236 A1 | 12/2008 |
| CA | 2 659 007 A1 | 9/2009 |
| CA | 2732148 A1 | 2/2010 |
| CA | 2 778 905 A1 | 8/2010 |
| CA | 2812174 A1 | 3/2011 |
| CN | 1498029 A | 5/2004 |
| CN | 1498482 A | 5/2004 |
| CN | 1668137 A | 9/2005 |
| CN | 1274114 C | 9/2006 |
| CN | 101005503 A | 7/2007 |
| CN | 101069390 A | 11/2007 |
| CN | 101095329 A | 12/2007 |
| CN | 101584150 A | 11/2009 |
| CN | 101584166 A | 11/2009 |
| CN | 101605342 A | 11/2009 |
| CN | 1498029 B | 5/2010 |
| CN | 101772929 A | 7/2010 |
| CN | 101069390 B | 12/2010 |
| CN | 102137024 A | 7/2011 |
| CN | 102457494 A | 5/2012 |
| CN | 102484656 A | 5/2012 |
| CN | 102572123 A | 7/2012 |
| CN | 101095329 B | 10/2012 |
| CN | 101605342 B | 12/2012 |
| CN | 102633232 A | 12/2012 |
| CN | 101005503 B | 1/2013 |
| CN | 101772929 B | 7/2014 |
| CN | 102457494 B | 10/2014 |
| DE | 602 01 827 T2 | 11/2005 |
| DE | 11 2005 003 306 T5 | 1/2008 |
| DE | 601 33 316 T2 | 7/2008 |
| DE | 603 17 751 T2 | 11/2008 |
| EP | 0 841 832 A2 | 5/1998 |
| EP | 0 841 832 A3 | 5/1999 |
| EP | 1 032 224 A2 | 8/2000 |
| EP | 1 032 224 A3 | 8/2000 |
| EP | 1 244 250 A1 | 9/2002 |
| EP | 1 266 516 A2 | 12/2002 |
| EP | 1 362 456 A2 | 11/2003 |
| EP | 1 371 173 A1 | 12/2003 |
| EP | 1 389 862 A1 | 2/2004 |
| EP | 1 411 743 A1 | 4/2004 |
| EP | 1 389 862 B1 | 11/2004 |
| EP | 1 526 697 A2 | 4/2005 |
| EP | 1 362 456 A4 | 5/2005 |
| EP | 1 575 327 A1 | 9/2005 |
| EP | 1 610 583 A1 | 12/2005 |
| EP | 1 526 697 A3 | 3/2006 |
| EP | 1 721 446 A1 | 11/2006 |
| EP | 1 829 300 A1 | 9/2007 |
| EP | 1 371 173 B1 | 11/2007 |
| EP | 1 411 743 B1 | 11/2007 |
| EP | 1 362 456 B1 | 3/2008 |
| EP | 1 974 304 A2 | 10/2008 |
| EP | 1 974 304 A4 | 10/2008 |
| EP | 1 610 583 B1 | 8/2009 |
| EP | 2 084 868 | 8/2009 |
| EP | 2 090 024 | 8/2009 |
| EP | 2 127 232 A1 | 12/2009 |
| EP | 2 165 489 A1 | 3/2010 |
| EP | 2 215 755 A1 | 8/2010 |
| EP | 2 227 048 A1 | 9/2010 |
| EP | 2 127 232 A4 | 3/2011 |
| EP | 2 165 489 A4 | 3/2011 |
| EP | 2 311 292 | 4/2011 |
| EP | 1 829 300 A4 | 5/2012 |
| EP | 2 449 749 A1 | 5/2012 |
| EP | 2 478 678 | 7/2012 |
| EP | 2 215 755 A4 | 10/2012 |
| EP | 1 829 300 B1 | 11/2012 |
| EP | 2 449 749 B1 | 3/2014 |
| EP | 1 266 516 B1 | 5/2014 |
| ID | W00200902627 | 9/2009 |

(56) References Cited

FOREIGN PATENT DOCUMENTS

| | | |
|---|---|---|
| IN | 24/2009 | 6/2009 |
| IN | 29/2009 | 7/2009 |
| JP | 2011-199384 A | 10/2011 |
| KR | 10-2009-0086428 A | 8/2009 |
| KR | 10-2009-0095621 A | 9/2009 |
| MX | 2009004811 A | 8/2009 |
| MX | 2009005751 A | 8/2009 |
| SG | 151991 A1 | 6/2009 |
| SG | 152752 A1 | 6/2009 |
| SG | 155474 | 10/2009 |
| WO | WO 01/50693 A1 | 7/2001 |
| WO | WO 01/69899 A2 | 9/2001 |
| WO | WO 01/69899 A3 | 9/2001 |
| WO | WO 01/80587 A1 | 10/2001 |
| WO | WO 02/082728 A1 | 10/2002 |
| WO | WO 02/082782 A2 | 10/2002 |
| WO | WO 02/082782 A3 | 10/2002 |
| WO | WO 03/027801 A2 | 4/2003 |
| WO | WO 2005/084002 A1 | 9/2005 |
| WO | WO 2006/067269 A1 | 6/2006 |
| WO | WO 2006/072099 A1 | 7/2006 |
| WO | WO 2006/078175 A2 | 7/2006 |
| WO | WO 2006/078175 A3 | 7/2006 |
| WO | WO 2007/044454 A2 | 4/2007 |
| WO | WO 2007/056158 A2 | 5/2007 |
| WO | WO 2007/087077 A2 | 8/2007 |
| WO | WO 2007/087077 A3 | 8/2007 |
| WO | WO 2008/027065 A1 | 3/2008 |
| WO | WO 2008/052340 A1 | 5/2008 |
| WO | WO 2008/064481 A1 | 6/2008 |
| WO | WO 2008/085614 A2 | 7/2008 |
| WO | WO 2008/085614 A3 | 7/2008 |
| WO | WO 2008/086350 A2 | 7/2008 |
| WO | WO 2008/086350 A3 | 7/2008 |
| WO | WO 2008/103652 A1 | 8/2008 |
| WO | WO 2008/085614 A8 | 10/2008 |
| WO | WO 2008/116296 A1 | 10/2008 |
| WO | WO 2008/151406 A1 | 12/2008 |
| WO | WO 2008/151406 A8 | 12/2008 |
| WO | WO 2009/070202 A1 | 6/2009 |
| WO | WO 2009/070278 A1 | 6/2009 |
| WO | WO 2010/012090 A2 | 2/2010 |
| WO | WO 2011/000405 A1 | 1/2011 |
| WO | WO 2011/032256 A1 | 3/2011 |
| WO | WO 01/89145 A2 | 11/2011 |
| WO | WO 2013/013189 A2 | 1/2013 |
| WO | WO 2013/120069 A1 | 8/2013 |
| WO | WO 2014/066155 A2 | 5/2014 |
| WO | WO 2014/117599 A1 | 8/2014 |
| WO | WO 2014/166258 A1 | 10/2014 |

OTHER PUBLICATIONS

Baker et al., "Cisco Support for Lawful Intercept in IP Networks," Internet Draft—working document of the Internet Engineering Task Force (IETF), accessible at http://www.ietf.org/ietf/lid-abstracts.txt, Apr. 2003, expires Sep. 30, 2003, pp. 1-15.
F. Baker et al. "RFC 3924—Cisco Architecture for Lawful Intercept in IP Networks." Oct. 2004.
Bhushan et al., "Federated Accounting: Service Charging and Billing in a Business-to-Business Environment," 0-7803-6719-7/01, © 2001 IEEE, pp. 107-121.
Cisco, "*Lawful Intercept Requirements Summary*," http://www.faqs.org/rfcs/rfc3924.html. Nov. 8, 2006.
DOTS IP Address Validation, "Overview", http://www.serviceobjects.com/products/dots_ipgeo.asp; printed Jun. 21, 2012.
DOTS Phone Exchange, "Overview", http://www.serviceobjects.com/demos/PhoneExchangeDemo.asp (URL no longer valid, current URL is http://www.serviceobjects.com/products/phone/phone-exchange); printed Jun. 21, 2012.
ETSI Technical Specification. "Lawful Interception (LI); Handover Interface and Service-Specific Details (SSD) for IP delivery; Part 5: Service-specific details for IP Multimedia Services." Apr. 2008, 25 pgs, v.2.3.1, France.
Handley, M. et al. "RFC 2543—SIP: Session Initiation Protocol." Mar. 1999.
IETF ENUM WG R STASTNY OEFEG Informational Numbering for VOIP and Other IP Communications: "Numbering for VIOP and other IP Communications, draft-stastny-enum-numbering-voip-00.txt", Oct. 1, 2003, pp. 1-43, XP015035676, ISSN: 0000-0004.
IP2Location, http://www.ip2location.com/; printed Jun. 20, 2012.
ETSI TS 122 173 V12.7,0 (Oct. 2014) Digital cellular telecommunications system (Phase 2+); Technical Specification 8.2,2.3—interoperability with PSTN/ISDN and mobile CS Networks, Contents and Forward, pp. 1-9; Sec. 8, pp. 14-17.
Huitema et al., "Architecture for Internet Telephony Service for Residential Customers," Academic Paper for *Bellcore*, Mar. 2, 1999, pp. 1-14.
Jajszczyk et al., "Emergency Calls in Flow-Aware Networks," *IEEE Communications Letters*, vol. 11, No. 9, Sep. 2007, pp. 753-755.
Ketchpel et al. "U-PAI: A universal payment application interface" *Second USENIX Workshop on Electronic Commerce Proceedings*, Aug. 1996, pp. 1-17.
Kim et al., "An Enhanced VoIP Emergency Services Prototype," *Proceedings of the 3rd International ISCRAM Conference* (B. Van de Walle and M. Turoff, eds.), Newark, NJ (USA), May 2006, pp. 1-8.
Kornfeld et al., "DVB-H and IP Datacast—Broadcast to Handheld Devices," *IEEE Transactions on Broadcasting*, vol. 53, No. 1, Mar. 2007, pp. 161-170.
Kortebi et al., "SINR-Based Routing in Multi-Hop Wireless Networks to Improve VoIP Applications Support," 1-4244-0667-6/07, © 2007 IEEE, pp. 491-496.
Lee et al., "VoIP Interoperation with KT-NGN," in *The 6th International Conference on Advanced Communication Technology*, Technical Proceedings, 2004, pp. 126-128, accompanied by Title and Contents—4 pages.
Lin et al., "Effective VoIP Coil Routng in WLAN and Celular Integration," *IEEE Communications Letters*, vol. 9, No. 10, Oct. 2005, pp. 874-376.
Lind AT&T S: "ENUM Call Flows for VoIP Interworking; draft-lind-enum-callflows-03.txt", Feb. 1, 2002, No. 3, Feb. 1, 2002, pp. 1-17, XP015004214, ISSN: 0000-0004.
List of North American Numbering Plan area codes, http://en.wikipedia.org/wiki/List_of_NANP_area_codes; printed Jun. 20, 2012.
Ma et al., "Realizing MPEG4 Video Transmission Based on Mobile Station over GPRS," 0-7803-9335-X/05, © 2005 IEEE, pp. 1241-1244.
Mintz-Habib et al., "A VoIP Emergency Services Architecture and Prototype," {mm2571,asr,hgs,xiaotaow}@cs.columbia.edu, 0-7803-9428-3/05, © 2005 IEEE, pp. 523-528.
Moberg & Drummond, "MIME-Based Secure Peer-to-Peer Business Data Interchange Using HTTP, Applicability Statement 2 (AS2)," *Network Working Group, Request for Comments: 4130, Category: Standards Track*, Copyright © The Internet Society Jul. 2005, pp. 1-47.
Munir, Muhammad Farukh, "Study of an Adaptive Scheme for Voice Transmission on IP in a Wireless Networking Environment 802.11e," *Dept. of Networks and Distributed Computing, Ecole Supérieure En Sciences Informatiques (ESSI), Université De Nice*, Jun. 2005, (pp. 1-35),—pp. 1-11.
Rosenberg, et al.; "RFC 3261—SIP: Session Initiation Protocol", Jun. 2002.
*Sippy SIP B2BUA*. "About Sippy RTPproxy." http://www.rtpproxy.org. Jul. 15, 2009.
Sripanidkulchai et al., "Call Routing Mangement in Enterprise VoIP Networks," *Copyright 2007 ACM* 978-1-59593-788-9/07/0008, 6 pages.
Stallings, William, "The Session Initiation Protocol," *The Internet Protocol Journal*, vol. 6, No. 1, Mar. 2003, pp. 20-30.
Thernelius, Fredrik; "SIP, NAT, and Firewalls," Master's Thesis; *ERICSSON, Department of Teleinformatics*, May 2000, pp. 1-69.
Townsley, et al.; "RFC 2661—Layer Two Tunneling Protocol 'L2TP'", Aug. 1999.

(56) References Cited

OTHER PUBLICATIONS

Trad et al., "Adaptive VoIP Transmission over Heterogeneous Wired/Wireless Networks," V. Roca and F. Rousseau (Eds.): *MIPS 2004, LNCS 3311*, pp. 25-36, 2004, © Springer-Verlag Berlin Heidelberg 2004.
Wikipedia, "International mobile subscriber identity (IMSI)," http://en.wikipedia.org/wiki/IMSI, Jul. 16, 2013.
Wikipedia, "Roaming," http://en.wikipedia.org/wiki//Roaming, Jul. 16, 2013.
Yu et al., "Service-Oriented Issues: Mobility, Security, Charging and Billing Management in Mobile Next Generation Networks," *IEEE BcN2006*, 1-4244-0146-1/06, © 2006 IEEE, pp. 1-10.
International Search Report and Written Opinion of the International Searching Authority completed Jun. 6, 2008 for related PCT/CA2008/000545.
Intenational Seach Report and Written Opinion of the International Searching Authority completed Feb. 6, 2008 for corresponding PCT/CA2007/001956.
International Preliminary Report on Patentability mailed May 14, 2009 for corresponding PCT/CA2007/001956.
International Search Report and Written Opinion of the International Searching Authority completed Mar. 3, 2008 for related PCT/CA2007/002150.
International Preliminary Report on Patentability mailed Feb. 13, 2009 for related PCT/CA2007/002150.
International Preliminary Report on Patentability and Written Opinion of the International Searching Authority mailed Feb. 10, 2011 for related PCT Application No. PCT/CA2009/001062, Feb. 1, 2011.
Written Opinion and International Search Report completed on Jun. 18, 2010 for related PCT Application No. PCT/CA2009/001317.
International Search Report and Written Opinion mailed on Mar. 12, 2010 for corresponding PCT Application No. PCT/CA2009/001062.
International Preliminary Report on Patentability issued on Sep. 29, 2009 for PCT/CA2008/000545.
International Preliminary Report on Patentability issued on Mar. 20, 2012 for PCT/CA2009/001317.
Extended European Search Report dated Nov. 2, 2012 for European Application No. EP 07 855 436.7.
Extended European Search Report dated Dec. 20, 2013 for European Application No. EP 09 849 358.8.
Extended European Search Report dated Apr. 16, 2014 for European Patent Application No. EP 09 802 316.1 which shares priority of U.S. Appl. No. 61/129,898, filed Jul. 28, 2008 with U.S. Appl. No. 13/056,277, filed Jan. 27, 2011, which is related to captioned U.S. Appl. No. 13/863,306, and cites above-identified reference Nos. 1 and 2.
Supplementary European Search Report for European Application No. 07 816 106, dated Jun. 18, 2012.
Supplementary European Search Report for European Application No. 07 816 106, dated Nov. 2, 2012.
Canadian Office Action dated Jan. 27, 2015 for Canadian Patent Application No. CA 2,681,984.
Chinese Office Action dated Mar. 24, 2011 for Chinese Patent Application No. CN 200780049791.5.
Chinese Office Action dated Jun. 23, 2011 for Chinese Patent Application No. CN 200780049136.X.
Indonesian Examination Report dated Jul. 5, 2012 for Indonesian Patent Application No. W-00200901414.
Indonesian Examination Report dated Feb. 8, 2013 for Indonesian Patent Application No. W-00200901165.
Mexican Exam Report dated Jul. 11, 2011 for Mexican Patent Application No. MX/a/2009/004811.
Mexican Notice of Allowance dated Sep. 2, 2011 for Mexican Patent Application No. MX/a/2009/005751.
Canadian Office Action dated Nov. 18, 2015 for Canadian Patent Application No. CA 2,681,984.
Canadian Office Action dated Dec. 1, 2015 for Canadian Patent Application No. CA 2,812,174.
Canadian Office Action dated Jan. 22, 2016 for Canadian Patent Application No. CA 2,916,220.
First Examination Report dated Dec. 9, 2015, India Patent Application No. 1047/MUMNP/2009, corresponding to U.S. Appl. No. 14/802,929, which is related to subject U.S. Appl. No. 14/802,872.
European Examination Report dated Nov. 26, 2015 for European Patent Application No. EP 07 816 106.4 which claims priority of U.S. Appl. No. 60/856,212, filed Nov. 2, 2006.
Canadian Office Action dated Mar. 3, 2016 for Canadian Patent Application No. CA 2,670,510.
Document Title: Complaint for Patent Infringement [Jury Demand]; Case Title: *voip-pal.com, Inc., a Nevada corporation*, Plaintiff, v. *Verizon Wireless Services, LLC, a Delaware limited liability corporation; Verizon Communications, Inc., a Delaware corporation; AT&T, Inc., a Delaware corporation; AT&T Corp., a Delaware corporation*; and Does I through X, inclusive, Defendants; Case No. 2:16-CV-00271; Court: United States District Court District of Nevada. Attachments: Table of Exhibits; Exhibit A; Exhibit B; Exhibit C; Exhibit D; Exhibit E; Chart 1 to Exhibit E; Chart 2 to Exhibit E; Chart 3 to Exhibit E; Chart 4 to Exhibit E; Chart 5 to Exhibit E; Chart 6 to Exhibit E; Exhibit F; Chart 1 to Exhibit F; Chart 2 to Exhibit F; Chart 3 to Exhibit F; Chart 4 to Exhibit F; Chart 5 to Exhibit F; Chart 6 to Exhibit F; Exhibit G; Exhibit H; and Addendum 1 to Exhibit H.
Document Title: Complaint for Patent Infringement [Jury Demand]; Case Title: *voip-pal.com, Inc., a Nevada corporation*, Plaintiff, v. *Apple, Inc., a California corporation*; Defendants; Case No. 2:16-CV-00260; Court: United States District Court District of Nevada. Attachments: Table of Exhibits; Exhibit A; Exhibit B; Exhibit C; Exhibit D; Chart 1 to Exhibit D; Chart 2 to Exhibit D; Chart 3 to Exhibit D; Chart 4 to Exhibit D; Exhibit E; Exhibit F; and Addendum 1 to Exhibit F.
Letter dated Nov. 30, 2015, from VoIP-Pal.com Inc. giving notice and inviting the company listed herein below to contact VoIP-Pal.com about U.S. Pat. No. 9,179,005 and U.S. Pat. No. 8,542,815 and related patents listed in the accompanying Attachment A. Sent to the following company: Apple Inc. in the U.S.
Letter dated Dec. 1, 2015, from VoIP-Pal.com Inc. giving notice and inviting the company listed herein below to contact VoIP-Pal.com about U.S. Pat. No. 9,179,005 and U.S. Pat. No. 8,542,815 and related patents listed in the accompanying Attachment A. Sent to the following company: Verizon Communications in the U.S.
Letters dated Dec. 18, 2015, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. Sent to the following companies: Airtel in India; Alcatel-Lucent in France; Avaya Inc. in the U.S.; AT&T in the U.S.; Blackberry in Canada; Cable One in the U.S.; CenturyLink in the U.S.; Charter Communications in the U.S.; Cisco Systems in the U.S.; Comcast in the U.S.; Cox Communications in the U.S.; Cricket Wireless in the U.S.; Facebook in the U.S.; Facebook in the U.S.; Freedom Pop in the U.S.; Frontier Communications in the U.S.; Google Inc. in the U.S.; HP in the U.S.; Juniper Networks in the U.S.; LoopPay, Inc. in the U.S.; Magic Jack in the U.S.; MetroPCS in the U.S.; Ooma in the U.S.; PayPal in the U.S.; Republic Wireless in the U.S.; Rok Mobile in the U.S.; Samsung Electronics-America in the U.S.; ShoreTel, Inc. in the U.S.; Siemens in Germany; Skype USA in the U.S.; Sprint in the U.S.; Square Cash in the U.S.; Suddenlink Communications in the U.S.; Talktone in the U.S.; Tango in the U.S.; Time Warner Cable in the U.S.; T-Mobile in the U.S.; Twitter in the U.S.; US Cellular in the U.S.; Venmo in the U.S.; Virgin Mobile USA in the U.S.; Vodafone in the UK; and Vonage in the U.S.
Letters dated Jan. 4, 2016, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. Sent to the following companies: Rogers Communications Inc. in Canada; Shaw Cable in Canada; Walmart in Alaska; and Wind Mobile in Canada.
Letters dated Jan. 21, 2016, from VoIP-Pal.com Inc. giving notice and inviting the companies listed herein below to contact VoIP-Pal.

(56) References Cited

OTHER PUBLICATIONS com about U.S. Pat. No. 9,179,005 and U.S. Pat. No. 8,542,815 and related patents listed in the accompanying Attachment A. Sent to the following companies: Alibaba (China) Co., Ltd in China; Comwave Telecommunications in Canada; and Intel in the U.S.

Letters dated Feb. 2, 2016, from VoIP-Pal.com Inc. giving notice and inviting the companies listed herein below to contact VoIP-Pal.com about U.S. Pat. No. 9,179,005 and U.S. Pat. No. 8,542,815 and related patents listed in the accompanying Attachment A. Sent to the following companies: Netflix Inc. in the U.S.; Skype Technologies in the U.S.; and WhatsApp Inc. in the U.S.

Document Title: United States Patent and Trademark Office; Before the Patent Trial and Appeal Board; *Apple Inc.*, Petitioner v. *voip-pal.com Inc.*, Patent Owner; Case No. TBD, U.S. Pat. No. 9,179,005; Petition for Inter Partes Review of U.S. Pat. No. 9,179,005; Dated Jun. 15, 2016. 70 sheets.

Document Title: In the United States Patent and Trademark Office; Petition for Inter Partes Review Pursuant to 37 C.F.R. §42.100 Et Seq.; in re U.S. Pat. No. 9,179,005; Currently in Litigation Styled: *VoIP-Pal.com, Inc.* v. *Apple Inc.*, Case No. 2:16-cv-00260-RFB-VCF; Issued: Nov. 3, 2015; Application Filed: Aug. 13, 2013; Applicant: Clay Perreault, et al.; Title: Producing Routing Messages for Voice Over IP Communications; Declaration of Henry H. Houh, PhD; Signed Jun. 14, 2016. 143 sheets.

Document Title: United States Patent and Trademark Office; Before the Patent Trial and Appeal Board; *Apple Inc.*, Petitioner v. *voip-pal.com Inc.*, Patent Owner; Case No. TBD, U.S. Pat. No. 8,542,815; Petition for Inter Partes Review of U.S. Pat. No. 8,542,815; Dated Jun. 15, 2016. 67 sheets.

Document Title: In the United States Patent and Trademark Office; Petition for Inter Partes Review Pursuant to 37 C.F.R. §42.100 Et Seq.; in re U.S. Pat. No. 8,542,815; Currently in Litigation Styled: *VoIP-Pal.com, Inc.* v. *Apple Inc.*, Case No. 2:16-cv-00260-RFB-VCF; Issued: Sep. 24, 2013; Application Filed: Nov. 1, 2007; Applicant: Clay Perreault, et al.; Title: Producing Routing Messages for Voice Over IP Communications; Declaration of Henry H. Houh, PhD; Signed Jun. 14, 2016. 143 sheets.

Document Title: Petition for Inter Partes Review of U.S. Pat. No. 8,542,815; United States Patent and Trademark Office; Before the Patent Trial and Appeal Board; *Unified Patents Inc.*, Petitioner v. *voip-pal.com Inc.*, Patent Owner; IPR2016-01082; U.S. Pat. No. 8,542,815; Producing Routing Messages for Voice Over IP Communications; Dated May 24, 2016. 64 sheets.

Document Title: Declaration of Michael Caloyannides; United States Patent and Trademark Office; Before the Patent Trial and Appeal Board; *Unified Patents Inc.*, Petitioner v. *voip-pal.com Inc.*, Patent Owner; IPR2016-01082; U.S. Pat. No. 8,542,815; Producing Routing Messages for Voice Over IP Communications; Signed May 23, 2016; Filed May 24, 2016. 84 sheets.

Document Title: Public Switched Telephone Networks: A Network Analysis of Emerging Networks; Daniel Livengood, Jijun Lin and Chintan Vaishnav; Engineering Systems Division; Massachusetts Institute of Technology; Submitted May 16, 2006; to Dan Whitney, Joel Moses and Chris Magee. 27 sheets.

Document Title: A Brief History of VoIP; Document One—The Past; Joe Hallock; joe@sitedifference.com; date on cover page: Nov. 26, 2004; Evolution and Trends in Digital Media Technologies—COM 538; Masters of Communication in Digital Media; University of Washington. 17 sheets.

Document Title: Petitioner's Voluntary Interrogatory Responses; United States Patent and Trademark Office; Before the Patent Trial and Appeal Board; *Unified Patents Inc.*, Petitioner v. *voip-pal.com Inc.*, Patent Owner; IPR20161082; U.S. Pat. No. 8,542,815; Producing Routing Messages for Voice Over IP Communications; Signed and Filed not later than May 24, 2016. 8 sheets.

Document Title: VoIP-PAL, The World is Calling!, "Over $7 Billion in Lawsuits File by *Voip-Pal.com Inc.* vs *Apple, Verizon and AT&T* for Various Patent Infringements," *Business Wire®, A Berkshire Hathaway Company*, Feb. 11, 2016. 2 sheets.

Technical Report, "3rd Generation Partnership Project; Technical Specification Group Core Network and Terminals; Study into routing of MT-SMs via the HPLMN (Release 7)," 3GPP TR 23.840 V0.1.0 (Feb. 2006), 13 pages.

Canadian Office Action dated Jun. 8, 2016 for Canadian Patent Application No. CA 2,916,217.

Communication for European Patent Application No. EP 07 816 106.4—Invitation pursuant to Article 94(3) and Rule 71(1) EPC dated Apr. 15, 2016. All pages.

Decision: Denying Institution of Inter Partes Review, 37 C.F.R. § 42.108, United States Patent and Trademark Office, Before the Patent Trial and Appeal Board, *Unified Patents Inc.*, Petitioner v, *voip-pal.com Inc.*, Patent Owner, Case IPR2016-01082, U.S. Pat. No. 8,542,815 B2, Paper 8, Entered: Nov. 18, 2016.

Decision: Institution of Inter Partes Review, 37 C.F.R. § 42.108, United States Patent and Trademark Office, Before the Patent Trial and Appeal Board, *Apple Inc.*, Petitioner v. *voip-pal.com Inc.*, Patent Owner, Case IPR2016-01201, U.S. Pat. No. 8,542,815 B2, Paper 6, Entered: Nov. 21, 2016.

Decision: Institution of Inter Partes Review, 37 C.F.R. § 42.108, United States Patent and Trademark Office, Before the Patent Trial and Appeal Board, *Apple Inc.*, Petitioner v. *voip-pal.com Inc.*, Patent Owner, Case IPR2016-01198, U.S. Pat. No. 9,179,00582, Paper 6, Entered: Nov. 21, 2016.

Scheduling Order: United States Patent and Trademark Office, Before the Patent Trial and Appeal Board, *Apple Inc.*, Petitioner v. *voip-pal.com Inc.*, Patent Owner, Cases IPR2016-01201, IPR2016-01198, U.S. Pat. No. 8,542,815 B2, U.S. Pat. No. 9,179,005 B2, Paper 7, Entered: Nov. 21, 2016.

Canadian Office Action dated Aug. 16, 2016 for Canadian Patent Application No. 2,681,984.

European Examination Report dated Aug. 29, 2016 for European Patent Application No. EP 07 855 436.7.

Communication under Rule 71(3) EPC—Intention to Grant—dated Oct. 14, 2016 for European Patent Application No. EP 07 816 106.4.

Patent Owner's Preliminary Response, Case No. IPR2016-01082, U.S. Pat. No. 8,542,815, *Unified Patents Inc.*, Petitioner, v. *voip-pal.com Inc.*, Patent Owner, Filing Date: Aug. 26, 2016, 80 pages.

Voip-Pal.com, Inc. Exhibit 2001, Comparison of portions of Petition with portions of Declaration, IPR2016-01082, *Unified Patents* v. *Voip-Pal*, Filing Date: Aug. 26, 2016, 9 pages.

Patent Owner's Preliminary Response to Petition for Inter Partes Review, Case No. IPR2016-01201, U.S. Pat. No. 8,542,815, *Apple Inc.*, Petitioner, v. *voip-pal.com Inc.*, Patent Owner, Filing Date: Sep. 19, 2016, 74 pages.

Voip-Pal.com, Inc. Exhibit 2001, Comparison of Petition (Ground 1) with Petition (Ground 2), IPR2016-01201, *Apple* v. *Voip-Pal*, Filing Date: Sep. 19, 2016, 19 pages.

Patent Owner's Preliminary Response to Petition for Inter Partes Review, Case No. IPR2016-01198, U.S. Pat. No. 9,179,005, *Apple Inc.*, Petitioner, v. *voip-pal.com Inc.*, Patent Owner, Filing Date: Sep. 21, 2016, 74 pages.

Voip-Pal.com, Inc. Exhibit 2001, Comparison of Petition (Ground 1) with Petition (Ground 2), IPR2016-01198, *Apple* v. *Voip-Pal*, Filing Date: Sep. 21, 2016, 21 pages.

Complaint for Patent Infringement, United States District Court, District of Nevada, Case No. 2:16-cv-2338, *voip-pal.com, Inc., a Nevada corporation*, Plaintiff v. *Twitter, Inc., A California corporation*, Defendant, Filed Oct. 6, 2016, 8 pages.

Civil Docket for Case #: 2:16-cv-02338-RFB-CWH, United States District Court, District of Nevada (Las Vegas), *Voip-Pal.com, Inc.* v. *Twitter, Inc.*, Date Filed: Oct. 6, 2016, 2 pages.

Table of Exhibits, Case 2:16-cv-02338-RFB-CWH, Filed Oct. 6, 2016, 1 page.

Exhibit A, Case 2:16-cv-02338-RFB-CWH, Filed Oct. 6, 2016, U.S. Pat. No. 8,542,815 B2, Issued Sep. 24, 2013, to Clay Perrault et al., 60 pages.

Exhibit B, Case 2:16-cv-02338-RFB-CWH, Filed Oct. 6, 2016, U.S. Pat. No. 9,179,005 B2, Issued Nov. 3, 2015, to Clay Perrault et al., 63 pages.

(56) References Cited

OTHER PUBLICATIONS

Exhibit C, Case 2.16-cv-02338-RFB-CWH, Filed Oct. 6, 2016, Letter dated Dec. 18, 2015 giving notice of U.S. Pat. No. 8,542,815 B2; U.S. Pat. No. 9,179,005 B2; and related Patents listed in Attachment A, 4 pages.
Exhibit D, Case 2:16-cv-02338-RFB-CWH, Filed Oct. 6, 2016, Asserted Claims and Infringement Conditions, United States District Court, District of Nevada, *voip-pal.com, Inc., a Nevada corporation*, Plaintiff v. *Twitter, Inc., a California corporation*, Defendants, 6 pages.
Chart 1 to Exhibit D, Case 2.16-cv-02338-RFB-CWH, Filed Oct. 6, 2016, Chart 1, Asserted Claims and Infringement Conditions Concerning U.S. Pat. No. 8,542,815, United States District Court, District of Nevada, *voip-pal.com, Inc., a Nevada corporation*, Plaintiff v. *Twitter, Inc., a California corporation*, Defendants, 20 pages.
Chart 2 to Exhibit D, Case 2:16-cv-02338-RFB-CWH, Filed Oct. 6, 2016, Chart 2, Asserted Claims and Infringement Conditions Concerning U.S. Pat. No. 9,179,005, United States District Court, District of Nevada, *voip-pal.com, Inc., a Nevada corporation*, Plaintiff v. *Twitter, Inc., a California corporation*, Defendants, 28 pages.
Exhibit E, Case 2:16-cv-02338-RFB-CWH, Filed Oct. 6, 2016, VPLM Active U.S. Patent Matters as of Oct. 1, 2016, 2 pages.
Exhibit F, Case 2:16-cv-02338-RFB-CWH, Filed Oct. 6, 2016, Twitter Royalty Monetization Analysis Overview, 4 pages.
Patent Owner Response to Petition, *Apples Inc.*, Petitioner, v. *Voip-Pal.Com. Inc.*, Patent Owner, Case No. IPR2016-01201, U.S. Pat. No. 5,542,815, United States Patent and Trademark Office, Before the Patent Trial and Appeal Board, Filed: Feb. 10, 2017, 76 pages.
Patent Owner Updated Exhibity List, *Apples Inc.*, Petitioner, v. *Voip-Pal.Com. Inc.*, Patent Owner, Case No. IPR2016-01201, U.S. Pat. No. 8,542,815, United States Patent and Trademark Office, Before the Patent Trial and Appeal Board, Filed: Feb. 10, 2017, 6 pages.
Voip-Pal Ex. 2002, IPR2016-01201, "Declaration of Ryan Thomas in Support of Pro Hac Vice Motion, " *Apples Inc.*, Petitioner, v. *Voip-Pal.Com. Inc.*, Patent Owner, Case No. IPR2016-01201, U.S. Pat. No. 8,542,815, United States Patent and Trademark Office, Before the Patent Trial and Appeal Board, Dated Jan. 20, 2017, 4 pages.
Voip-Pal Ex. 2003, IPR2016-01201, "Technical Review of Digifornica VoIP System" DIGIFONICA, Global Telephone Solutions, Author: John Rutter, Stuart Gare, Version V0.7 (Draft), Date May 7, 2005, 35 pages.
Voip-Pal Ex. 2004, IPR2016-01201, Memo—"Subject: Smart 421 Contract signed and Faxed," From: Clay S. Perreault, Date Jun. 6. 2005, 8:53 AM, To: Steve Nicholson, et al., 2 pages.
Voip-Pal Ex. 2005, IPR2016-01201, Memo—"Subject: Digifonica Technology review," From: Clay Perreault, Date Jun. 6, 2005, 5:37 PM; To: John Rutter, et al., 5 pages.
Voip-Pal Ex. 2006, IPR2016-01201, Memo—"Subject: Re: Sample code for review Next document upload complete," From: Clay Perreault, Date: Jun. 15, 2005, 3:28 PM, To: John Rutter, et al., 3 pages.
Voip-Pal Ex. 2007, IPR 2016-01201, DigiFonica International Inc Memo—"[Fwd: Digifonica Technical Review—draft report]," From Clay Perreault, To: Rod Thomson, et al., Tue, Jul. 5, 2005 at 4:45 PM, 2 pages.
Voip-Pal Ex. 2007, IPR2016-01201, John Rutter—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Jan. 31, 2017, 4 pages.
Voip-Pal Ex. 2009, IPR2016-01201, Stuart Gare—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Jan. 31, 2017, 4 pages.
Voip-Pal Ex. 2010, IPR2016-01201, Pentti Kalevi Huttunen—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Feb. 3, 2017, 4 pages.
Voip-Pal Ex. 2011, IPR2016-01201, Ryan Purita—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Jan. 31, 2017, 3 pages.
Voip-Pal Ex. 2012, IPR2016-01201, Johan Emil Viktor Björsell—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Feb. 9, 2017, 9 pages.
Voip-Pal Ex. 2013, IPR2016-01201, Clay Perreault—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Feb. 8, 2017, 6 pages.
Voip-Pal Ex. 2014, IPR2016-01201, RBR Source Code, Version 361, "call_e164.class.php RBR Version 361, Jun. 6, 2005 09:22:59," 45 pages.
Voip-Pal Ex. 2015, IPR2016-01201, RBR Source Code Log for Trunk Directory, "r1879 | cdelalande | Oct. 31, 2006 17:07:46-0800 (Tue, Oct. 31, 2006) | 3 lines," 56 pages.
Voip-Pal Ex. 2016, IPR2016-01201, William Henry Mangione-Smith—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Feb. 10, 2017, 82 pages.
Voip-Pal Ex. 2017, IPR2016-01201, DF DigiFonica International Inc Memo—"notes from your presentation, 1 message" From Konstantin Kropivny, To: Emil Björsell, Tue, Jun. 14, 2005 at 7:33PM, 4 pages.
Voip-Pal Ex. 2018, IPR2016-01201, David Terry—"Declaration in Support Patent Owner Response to Inter Partes Petition," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Feb. 8, 2017, 5 pages.
Voip-Pal Ex. 2019, IPR2016-01201, DR DigiFonica International Inc Memo—"Software release 10:30 am PST—11:00am PST for Aug. 25, 2005. 1 message" From Samantha Edwards, To: everyone@digifonica.com, Wed., Aug. 24, 2005 at 4:02 PM, 8 pages.
Voip-Pal Ex. 2020, IPR2016-01201, "Next Generation Networks—A Migration Path Digifonica Voice Over IP Technologies. Technology Overview DRAFT Jun. 3, 2005, Not for Distribution," by Clay S Perreault, CEO/CTO, Digifonica International Ltd, Gibraltar, 45 pages.
Voip-Pal Ex. 2021, IPR2016-01201, DF DigiFonica International Inc Memo—"Software roll out for supermodes.::Salm Rev 341, RBR Rev 341 added, 1 message" Fuad A. To: E. Björsell, Tue, May 31, 2005 at 1:13 PM, 1 page.
Voip-Pal Ex. 2022, IPR2016-01201, DF DigiFonica International Inc Memo—"Salm Rev 341, RBR Rev 341, 2 message" Emil Björsell To: Fuad, et al., Tue, May 31, 2005 at 2:38 and 2:44 PM, 1 page.
Voip-Pal Ex. 2023, IPR2016-01201, DF DigiFonica International Inc Memo—"Software roll out of supernodes.::RBR Roll out Rev 353 added, 1 message" Fuad A. To: E. Björsell, Thu, Jun. 2, 2005 at 1:12 PM, 1 page.

(56) References Cited

OTHER PUBLICATIONS

Voip-Pal Ex. 2024, IPR2016-01201, DF DigiFonica International Inc Memo—"Software roll out for supernodes.::RBR Roll out Rev 358 added, 1 message" Fuad A. To: E. Björsell, Sun, Jun. 5, 2005 at 1:18 PM, 1 page.
Voip-Pal Ex. 2025, IPR2016-01201, DF DigiFonica International Inc Memo—"Software roll out for supernodes.::RBR Roll out Rev 361 updated, 1 message" Fuad A. To: E. Björsell, Mon., Jun. 6, 2005 at 9:26 AM, 1 page.
Voip-Pal Ex. 2026, IPR2016-01201, DF DigiFonica International Inc Memo—"RBR Roll out Rev 361, 1 message" David Terry To: Fuad, et al., Mon., Jun. 6, 2005 at 9:33 AM, 1 page.
Voip-Pal Ex. 2027, IPR2016-01201, DF DigiFonica International Inc Memo—"RBR Roll out Rev 361, 1 message" Emil Björsell To: Fuad, et al., Mon., Jun. 6, 2005 at 11:33 AM, 1 page.
Voip-Pal Ex. 2030, IPR2016-01201, DF DigiFonica International Inc Memo—"Software roll out for supermodes.::RBR Rev 541 updated, 1 message" Fuad A. To: E. Björsell, Thu, Aug. 4, 2005 at 11:57 AM, 1 page.
Voip-Pal Ex. 2031, IPR2016-01201, DF DigiFonica International Inc Memo—"RBR Rev 541, 1 message" David Terry To: Fuad, et al., Thu, Aug. 4, 2005 at 1:58 PM, 1 page.
Voip-Pal Ex. 2032, IPR2016-01201, DF DifiFonica International Inc Memo—"RBR Rev 541, 1 message" Emil Björsell To: Fuad, et al., Thu, Aug. 4, 2005 at 3:59 PM, 1 page.
Voip-Pal Ex. 2033, IPR2016-01201, DR DigiFonica International Inc Memo—"Software roll out for supermodes.::RBR Roll out Rev 554 added, 1 message" Fuad A. To: Emil Björsell, Mon, Aug. 8, 2005 at 10:55 AM, 1 page.
Voip-Pal Ex. 2034, IPR2016-01201, DF DigiFonica International Inc Memo—"RBR Roll out Rev 554, 2 messages" David Terry To: Fuad, et al., Mon, Aug. 8, 2005 at 11:48 AM and 12:00 PM, 1 page.
Voip-Pal Ex. 2035, IPR2016-01201, DF DigiFonica International Inc Memo—"RBR Roll out Rev 554, 1 message" Emil Björsell To: Fuad, et al., Mon, Aug. 8, 2005 at 12:09 PM, 1 page.
Voip-Pal Ex. 2036, IPR2016-01201, DF DigiFonica Internatioanl Inc Memo—"Digifonica: RBR and Salma Deployment," Samanta Edwards To: everyone@digifonica.com, Mon, Aug. 8, 2005 at 4:12 PM, 4 pages.
Voip-Pal Ex. 2042, IPR2016-01201, DF DigiFonica International Inc Memo—"RBR Roll out Rev 693==>694, 1 message" Chris Huff To: Fuad, et al., Tue, Aug. 23, 2005 at 1:33 PM, 1 page.
Voip-Pal Ex. 2043, IPR2016-01201, "Deposition of Henry H. Houh, Ph.D., Volume I, Taken on Behalf of the Patent Owner," *Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Jan. 25, 2017, 128 pages.
Voip-Pal Ex. 2044, IPR2016-01201, "Deposition of Henry H. Houh, Ph.D., Volume II, Taken on Behalf of the Patent Owner,"*Apple Inc.*, Petitioner, v. *Voip-Pal.Com, Inc.*, Patent Owner, Case No. IPR2016-01201, U.S. Pat. No. 8,542,815, United States Patent and Trademark Office, Before the Patent Trial and Appeal Board, Dated: Jan. 26, 2017, 158 pages.
Voip-Pal Ex. 2045, IPR2016-01201, Curriculum Vitae of William Henry Mangione-Smith, Ph.D., 23 pages.
Voip-Pal Ex. 2046, IPR2016-01201, U.S. Pat. No. 3,725,596, Issued Apr. 3, 1973, Rodney Robert Maxon et al., 18 pages.
Voip-Pal Ex. 2047, IPR2016-01201, "Merlin® Communications System, Centrex/PBS Connection,"Lucent Technologies, Bell Labs Innovations, © 1984 AT&T, 999-500-138 IS, Issue 1, Mar. 1985, 26 pages.
Voip-Pal Ex. 2048, IPR2016-01201, "Telephone Features," Quick Reference Guide, Definity, Rockefeller Group, Telecommunications Services, Inc., 2000, 2 pages.
Voip-Pal Ex. 2049, IPR2016-01201, Valdar, Andy, *Understanding Telecommunications Networks*, ©2006 The Institution of Engineering and Technology, London, UK, Title page, copyright page, pp. 38-39.

Voip-Pal Ex. 2050, IPR2016-01201, Horak, Ray, "Webster's New World® Telecom Dictionary," © 2008 by Wiley Publishing, Inc., Indianapolis, Indiana, Title page, copyright page, p. 133.
Patent Owner Response to Petition, *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Filed: Feb. 10, 2017, 78 pages.
Patent Owner Updated Exhibit List, *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Filed: Feb. 10, 2017, 6 pages.
Voip-Pal Ex. 2002, IPR2016-011988, "Declaration of Ryan Thomas in Support of Pro Hac Vice Motion," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Jan. 20, 2017, 4 pages.
Voip-Pal Ex. 2003, IPR20116-01198, "Technical Review of Digifonica VoIP System," Digifonica, Global Telelphone Solutions, Author: John Rutter, Stuart Gare, Version V0.7 (Draft), Date: May 7, 2005, 35 pages.
Voip-Pal Ex. 2004, IPR2016-01198, Memo—"Subject: Smart 421 Contract signed and Faxed," From: Clay S. Perreault, Date: Jun. 6, 2005, 8:53 AM, To: Steve Nicholson, et al., 2 pages.
Voip-Pal Ex. 2005, IPR2016-01198, Memo—"Subject Digifonica TEchnology review," From: Clay Perreault, Date: Jun. 6, 2005, 5:37 PM; To: John Retter, et al., 5 pages.
Voip-Pal Ex. 2006, IPR2016-01198, Memo—"Subject: Re: Sample Code for review Next document upload complete," From: Clay Perreault, Date: Jun. 15, 2005, 3:28 PM, To: John Rutter, et al., 3 pages.
Voip-Pal Ex. 2007, IPR2016-01198, DigiFonica International Inc Memo—"[Fwd: Digifonica Technical Review—draft report]," From Clay Perreault, To: Rod Thomson, et al., Tue, Jul. 5, 2005 at 4:45 PM, 2 pages.
Voip-Pal Ex. 2008, IPR2016-01198, John Rutter—"Declaration in Support Patent Owner Response to Inter Partes Petition," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Jan. 31, 2017, 4 pages.
Voip-Pal Ex. 2009, IPR2016-01198, Stuart Gare—"Declaration in Support Patent Owner Response to Inter Partes Petition," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Feb. 2, 2017, 4 pages.
Voip-Pal Ex. 2010, IPR2016-01198, Pentti Kalevi Huttunen—"Declaration in Support Patent Owner Response to Inter Partes Petition," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Feb. 3, 2017, 4 pages.
Voip-Pal Ex. 2011, IPR2016-01198, Ryan Purita—"Declaration in Support Patent Owner Response to Inter Partes Petition," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Jan. 31, 2017, 3 pages.
Voip-Pal Ex. 2012, IPR2016-01198, Johan Emil Viktor Björsell—"Declaration in Support Patent Owner Response to Inter Partes Petition, " *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Feb. 9, 2017, 9 pages.
Voip-Pal Ex. 2013, IPR2016-01198, Clay Perreault—"Declaration in Support Patent Owner Response to Inter Partes Petition," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Feb. 8, 2017, 6 pages.

(56) References Cited

OTHER PUBLICATIONS

Voip-Pal Ex. 2014, IPR2016-01198, RBR Source Code, Version 361, "call_e164.class.php RBR Version 361, Jun. 6, 2005 09:22:59," 45 pages.
Voip-Pal Ex. 2015, IPR2016-01198, RBR Source Code Log for Trunk Directory, "r1879 | cdelalande | Oct. 31, 2006 17:07:46 -0800 (Tue, Oct. 31, 2006) | 3 lines," 56 pages.
Voip-Pal Ex. 2016, IPR2016-01198, William Henry Mangione-Smith—"Declaration in Support Patent Owner Response to Inter Partes Petition," *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Feb. 10, 2017, 96 pages.
Voip-Pal Ex. 2017, IPR2016-01198, DF DigiFonica International Inc Memo—"notes from your presentation, 1 message" From Konstantin Kropivny, To: Emil Björsell, Tue, Jun. 14, 2005 at 7:33PM, 4 pages.
Voip-Pal Ex. 2018, IPR2016-01198, Dave Terry—"Declaration in Support Patent Owner Response to Inter Partes Petition, " *Apple Inc.*, Petitioner, v. *Voip-Pal.Com, Inc.*, Patent Owner, Case No. IPR2016-01198, U.S. Pat. No. 9,179,005, United States Patent and Trademark Office, Before the Patent Trial and Appeal Board, Dated: Feb. 8, 2017. 5 pages.
Voip-Pal Ex. 2019, IPR2016-01198, DF DigiFonica International Inc Memo—"Software release 10:30 am PST—11:00am PST for Aug. 25, 2005. 1 message" From Samantha Edwards, To: everyone@digifonica.com, Wed., Aug. 24, 2005 at 4:02 PM, 8 pages.
Voip-Pal Ex. 2020, IPR2016-01198, "Next Generation Networks—A Migration Path Digifonica Voice Over IP Technologies. Technology Overview, DRAFT Jun. 3, 2005, Not for Distribution," by Clay S Perreault, CEO/CTO, Digifonica International Ltd, Gibraltar, 45 pages.
Voip-Pal Ex. 2021, IPR2016-01198, DF DigiFonica International Inc Memo—"Software roll out for supernods.::Salm Rev 341, RBR 341 added, 1 message" Fuad A. To: E. Björsell, Tue, May 31, 2005 at 1:13 PM, 1 page.
Voip-Pal Ex. 2022, IPR2016-01198, DF DigiFonica International Inc Memo—"Salm Rev 341, RBR Rev 341, 2 message" Emil Björsell To: Fuad, et al., Tue, May 31, 2005 at 2:38 and 2:44 PM, 1 page.
Voip-Pal Ex. 2023, IPR2016-01198, DF DigiFonica International Inc Memo—"Software roll out for supernodes.::RBR Roll out Rev 353 added, 1 message" Fuad A. To: E. Bjösell, Thu, Jun. 2, 2005 at 1:12 PM, 1 page.
Voip-Pal Ex. 2024, IPR2016-01198, DF DigiFonica International Inc Memo—"Software roll out for supernodes.::RBR Roll out Rev 358 added, 1 message" Fuad A. To: E. Björsell, Sun, Jun. 5, 2005 at 1:18 PM, 1 page.
Voip-Pal Ex. 2025, IPR2016-01198, DF DigiFonica International Inc Memo—"Software roll out for supernods.::RBR Roll out Rev 361 updated, 1 message" Fuad A. To: E. Björsell, Mon., Jun. 6, 2005 at 9:25 AM, 1 page.
Voip-Pal Ex. 2026, IPR2016-01198, DF DigiFonica International Inc Memo—"RBR Roll Out Rev 361, 1 message" David Terry To: Fuad, et al., Mon., Jun. 6, 2005 at 9:33 AM, 1 page.
Voip-Pal Ex. 2027, IPR2016-01198, DF DigiFonica International Inc Memo—"RBR Roll out Rev 361, 1 message" Emil Björsell To: Fuad, et al., Mon., Jun. 6, 2005 at 11:33 AM, 1 page.

Voip-Pal Ex. 2030, IPR2016-01198, DF DigiFonica International Inc Memo—"Software roll out for supernodes.::RBR Rev 541 updated, 1 message" Fuad A. To: E. Björsell, Thu, Aug. 4, 2005 at 11:57 AM, 1 page.
Voip-Pal Ex. 2031, IPR2016-01198, DF DigiFonica International Inc Memo—"RBR Rev 541, 1 message" David Terry To: Fuad, et al., Thu, Aug. 4, 2005 at 1:58 PM, 1 page.
Voip-Pal Ex. 2032, IPR2016-01198, DF DigiFonica International Inc Memo—"RBR Rev 541, 1 message" Emil Björsell To: Fuad, et al., Thu, Aug. 4, 2005 at 3:59 PM, 1 page.
Voip-Pal Ex. 2033, IPR2016-01198, DF DigiFonica International Inc Memo—"Software roll out for supernodes.::RBR Roll out Rev 554 added, 1 message" Fuad A. To: Emil Björsell, Mon, Aug. 8, 2005 at 10:55 AM, 1 page.
Voip-Pal Ex. 2034, IPR2016-01198, DF DigiFonica International Inc Memo—"RBR Roll out Rev 554, 2 messages" David Terry To: Fuad, et al., Mon, Aug. 8, 2005 at 11:48 AM and 12:00 PM, 1 page.
Voip-Pal Ex. 2035, IPR2016-01198, DF DigiFonica International Inc Memo—"RBR Roll out Rev 554, 1 message" Emil Björsell To: Fuad, et al., Mon, Aug. 8, 2005 at 12:09 PM, 1 page.
Voip-Pal Ex. 2036, IPR2016-01198, DF DigiFonica International Inc Memo—"Digifonica: RBR and Salma Deployment," Samantha Edwards To: everyone@digifonica.com, Mon, Aug. 8, 2005 at 4:12 PM, 4 pages.
Voip-Pal Ex. 2042, IPR2016-01198, DF DigiFonica International Inc Memo—"RBR Roll out Rev 693==>694, 1 message" Chris Huff To: Fuad, et al., Tue, Aug. 23, 2005 at 1:33 PM, 1 page.
Voip-Pal Ex. 2043, IPR2016-01198, "Deposition of Henry H. Houh, Ph.D., Volume I, Taken on Behalf of the Patent Owner," *Apple Inc.*, Petitioner, v. *Voip-Pal.Com, Inc.*, Patent Owner, Case No. IPR2016-01201 U.S. Pat. No. 8,542,815, United States Patent and Trademark Office, Before the Patent Trial and Appeal Board, Dated: Jan. 25, 2017, 128 pages.
Voip-Pal Ex. 2044, IPR2016-01198, "Deposition of Henry H. Houh, Ph.D., Volume II, Taken on Behalf of the Patent Owner," *Apple Inc.*, Petitioner, v. *Voip-Pal.Com, Inc.*, Patent Owner, Case No. IPR2016-01201 U.S. Pat. No. 8,542,815, United States Patent and Trademark Office, Before the Patent Trial and Appeal Board, Dated: Jan. 26, 2017, 158 pages.
Voip-Pal Ex. 2045, IPR2016-01198, Curriculum Vitae of William Henry Mangione-Smith, Ph.D., 23 pages.
Voip-Pal Ex., 2046, IPR2016-01198, U.S. Pat. No. 3,725,596, Issued Apr. 3, 1973, Rodney Robert Maxon et al., 18 pages.
Voip-Pal Ex. 2047, IPR2016-01198, "Merlin® Communications System, Centrex/PBS Connection," Lucent Technologies, Bell Labs Innovations,© 1984 AT&T, 999-500-138 IS, Issue 1, Mar. 1985, 26 pages.
Voip-Pal Ex. 2048, IPR2016-01198, "Telephone Features," Quick Reference Guide, Definty, Rockefeller Group, Telecommunications Services, Inc., 2000, 2 pages.
Voip-Pal Ex. 2049, IPR2016-01198, Valdar, Andy, Understanding Telecommunications Networks, ©2006 The Institution of Engineering and Technology, London, UK, Title plage, copyright page, pp. 38-39.
Voip-Pal Ex. 2050, IPR2016-01198, Horak, Ray, "Webster's New World® Telecom Dictionary,"© 2008 by Wiley Publishing, Inc., Indianapolis, Indiana, Title page, copyright page, p. 133.

\* cited by examiner

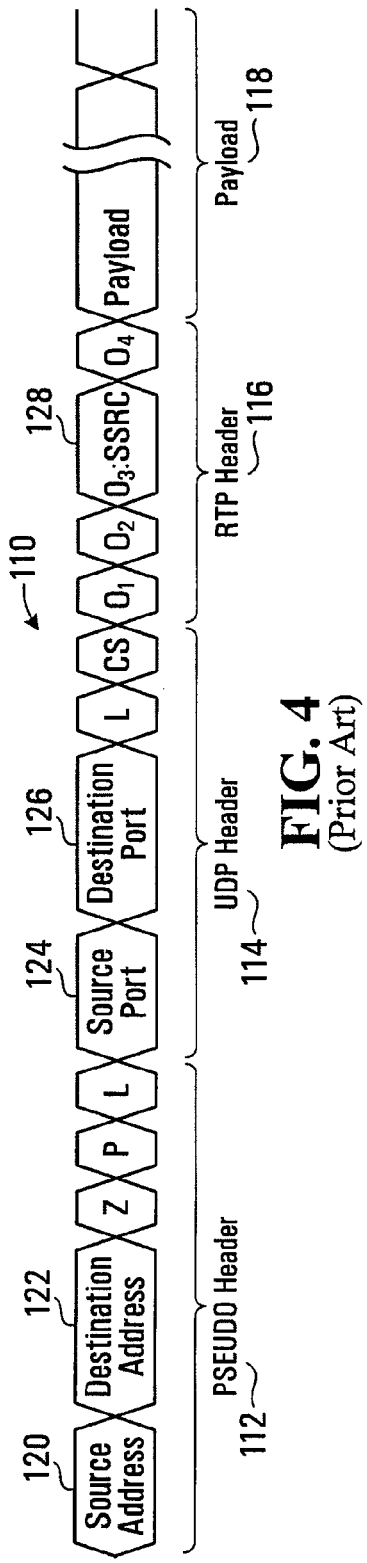

Session Information

CALLER RTP port: R 22125
CALLER RTCP port: Optional
CALLEE RTP port: E 22123
CALLEE RTCP port: Optional CALLER Information CALLER IP Address: 192.168.0.30
CALLER UDP Port No.: 33333
CALLER Sync Source (SSRC): SSRC$_R$
Packets Sent:
Packets Received: 2

CALLEE Information

CALLEE IP Address: 192.168.3.10
CALLEE UDP Port No.: 33123
CALLEE Sync Source (SSRC):
Packets Sent:
Packets Received:

FIG. 8

Session Information

CALLER RTP port: R 22125
CALLER RTCP port: Optional
CALLEE RTP port: E 22123
CALLEE RTCP port: Optional CALLER Information CALLER IP Address: 192.168.0.20
CALLER UDP Port No.: 12345
76— CALLER Sync Source (SSRC): SSRC$_R$ —146
Packets Sent:
Packets Received: 1

CALLEE Information

CALLEE IP Address: 192.168.3.10
CALLEE UDP Port No.: 33123
CALLEE Sync Source (SSRC):
Packets Sent:
Packets Received:

FIG. 7

UNINTERRUPTED TRANSMISSION OF INTERNET PROTOCOL TRANSMISSIONS DURING ENDPOINT CHANGES

CROSS-REFERENCE TO RELATED APPLICATIONS

This application is a continuation of U.S. application Ser. No. 14/092,831, filed Nov. 27, 2013, which is a continuation of U.S. application Ser. No. 13/496,864, filed Mar. 16, 2012, now U.S. Pat. No. 8,675,566, entitled "Uninterrupted Transmission of Internet Protocol Transmissions During Endpoint Changes", which is a national phase entry of PCT/CA2009/001317, filed Sep. 17, 2009, all of which are incorporated by reference in their entireties.

BACKGROUND

Field

This invention relates to Internet protocol (IP) transmissions and, more particularly, to uninterrupted transmission of IP transmissions containing real time transport protocol (RTP) data during endpoint changes.

Description of the Related Technology

Internet Protocol (IP) transmission systems are known to use media relays to relay IP transmissions from one endpoint to another. In a telephone system, the media relay relays IP transmissions between a caller and a callee. An IP session is established by a call controller, which interacts with the media relay, the caller and the callee to convey to each of these entities the IP addresses and ports to which they should send IP transmissions and from which they should expect IP transmissions. The media relay is configured to accept packets conveyed by IP transmissions from specified caller and callee IP addresses and ports. In some systems, such as mobile telephone systems, a mobile telephone may be in communication with a first base station while in a certain geographical area and there may be a handoff of the call to another base station when the mobile telephone is moved to a different geographical location. Communications between the base stations and the mobile telephones are conducted on a Global System from Mobile Communication (GSM) network or other cellular network, for example, and the base stations convert messages to and from the GSM network and the IP network and thus, the base stations establish the caller and callee IP addresses and ports. Each base station will have a unique IP address and UDP port number that it associates or assigns to the mobile telephone with which it has established communication in the conventional manner over the cellular network. Thus, a conventional media relay will reject IP streams from the new base station after handoff of the call because such streams are seen as being transmitted by an unauthorized source. This generally prevents voice over IP telephone calls from being made through systems that employ media relays without further call handling.

The Session Initiation Protocol (SIP) RFC 3261 provided by the Internet Engineering Task Force (IETF) specifies a mechanism for an endpoint to notify another endpoint if its IP address changes. This mechanism employs a signaling message that conveys an identification of new media properties for the endpoint whose IP address has changed. The use of SIP messages for this purpose, however, adds extra overhead and delays to the call as signaling messages must be routed through the call controller and the call controller must communicate with the media relay and endpoints to re-configure the media relay to accept IP transmissions from the endpoint having the new IP address and to cause IP transmission to be relayed thereto each time a handoff occurs.

SUMMARY OF CERTAIN EMBODIMENTS

In accordance with one aspect, there is provided a method for facilitating uninterrupted transmission of Internet Protocol (IP) transmissions, during endpoint changes. The method involves, in response to receiving an IP transmission at a caller port or a callee port of a media relay through which IP transmissions of an IP communication session are relayed, locating a session information record having a caller port identifier or callee port identifier matching a destination port identifier in the IP transmission. The caller port identifier identifies the caller port and the callee port identifier identifies the callee port. When the destination port identifier in the IP transmission matches the caller port identifier of the session information record and when a source IP address identifier or a source port identifier in the IP transmission do not match a caller IP address identifier or the caller port identifier respectively of the session information record, and when a session identifier in the IP transmission matches a caller session identifier in the session information record, the method involves setting the source IP address identifier and the source port identifier in the IP transmission as the caller IP address identifier and caller port identifier respectively of the session information record. When the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record, the method involves setting the source IP address identifier and the source port identifier of the IP transmission as the callee IP address identifier and the callee port identifier respectively of the session information record.

The method may involve maintaining the session information records, each record associating session information, caller information and callee information for a respective IP communication session, and the session information including the caller and callee port identifiers identifying a caller port and a callee port respectively of the media relay through which IP transmissions of the IP communication session are relayed. The caller information may include the caller IP address identifier and the caller port identifier to which IP transmissions received at the callee port are transmitted from the media relay, and a caller session identifier. The callee information may include the callee IP address identifier and the callee port identifier to which IP transmissions received at the caller port are transmitted from the media relay, and may further include a callee session identifier.

The method may involve storing the session identifier received in the IP transmission in the caller session identifier field in the session information record, when the pre-determined IP transmission is received from the caller, and storing the session identifier received in the IP transmission in the callee session identifier field in the session information record, when the pre-determined IP transmission is received from the callee.

The method may involve causing the media relay to forward the IP transmission to the callee at the callee IP address and callee port identified by the callee IP address identifier and callee port identifier respectively of the session information record and identifying the source of the IP transmission forwarded to the callee with the callee port identifier, when the IP transmission was received at the caller port.

The method may involve causing the media relay to forward the IP transmission to the caller at the caller IP address and caller port identified by the caller IP address identifier and caller port identifier respectively of the record and identifying the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data, the caller port may be a caller RTP port and the callee port may be a callee RTP port.

In accordance with another aspect, there is provided a media relay apparatus for facilitating uninterrupted transmission of Internet Protocol (IP) transmissions during endpoint changes. The apparatus includes connection provisions for providing a connection to an IP network, provisions for defining a logical input/output interface defining caller and callee ports in the connection provisions. The apparatus further includes provisions for relaying IP transmissions of an IP communication session between a caller port and a callee port of the connection provisions. The apparatus further includes provisions for receiving an IP transmission at the caller port or the callee port. The apparatus further includes provisions for locating a session information record having a caller port identifier or a callee port identifier matching a destination port identifier included in the IP transmission. The caller port identifier identifies the caller port and the callee port identifier identifies the callee port. The apparatus further includes provisions for setting a source IP address identifier and a source port identifier in the IP transmission as the caller IP address identifier and caller port identifier respectively of the session information record when the destination port identifier in the IP transmission matches the caller port identifier of the session information record, and when the source IP address identifier or the source port identifier in the IP transmission do not match a caller IP address identifier or the caller port identifier respectively of the session information record, and when a session identifier in the IP transmission matches a caller session identifier in the session information record. The apparatus further includes provisions for setting the source IP address identifier and the source port identifier of the IP transmission as the callee IP address identifier and the callee port identifier respectively of the session information record when the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record.

The apparatus may include provisions for maintaining the session information records, each record associating session information, caller information and callee information for a respective IP communication session. The session information may include the caller and callee port identifiers identifying a caller port and a callee port respectively of the connection provisions through which IP transmissions of the IP communication session are relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The apparatus may include provisions for storing the session identifier received in the IP transmission in the caller session identifier field in one of the session information records, when the pre-determined IP transmission is received from the caller, and provisions for storing the session identifier received in the IP transmission in the callee session identifier field in one of the session information records, when the pre-determined IP transmission is received from the callee.

The apparatus may include provisions for causing the connection provisions to forward the IP transmission to the callee at the callee IP address and callee port identified by the callee IP address identifier respectively and callee port identifier of the session information record, and provisions for identifying the source of the IP transmission forwarded to the callee with the callee port identifier, when the IP transmission was received at the caller port.

The apparatus may include provisions for causing the connection provisions to forward the IP transmission to the caller at the caller IP address and caller port identified by the caller IP address identifier and caller port identifier respectively of the session information record, and provisions for identifying the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data, the caller port may be a caller RTP port and the callee port may be a callee RTP port.

In accordance with another aspect, there is provided a media relay apparatus for facilitating uninterrupted transmission of Internet protocol (IP) transmissions during endpoint changes. The apparatus includes a processor circuit operably configured to define caller and callee ports on a network and operably configured to relay IP transmissions of an IP communication session between a defined caller port and a defined callee port. The processor circuit is further configured to locate a session information record having a caller port identifier or a callee port identifier matching a destination port identifier included in the IP transmission. The caller port identifier identifies the caller port and the callee port identifier identifies the callee port. The processor circuit is further configured to set a source IP address identifier and the source port identifier in the IP transmission as the caller IP address identifier and caller port identifier respectively of the session information record when the destination port identifier in the IP transmission matches the caller port identifier of the session information record, and when the source IP address identifier or a source port identifier in the IP transmission do not match a caller IP address identifier or the caller port identifier respectively of the session information record, and when a session identifier in the IP transmission matches a caller session identifier in the session information record. The apparatus further includes setting the source IP address identifier and the source port identifier of the IP transmission as the callee IP address identifier and the callee port identifier respectively of the session information record when the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record.

The processor circuit may be further configured to maintain the session information records, each record associating session information, caller information and callee information for a respective IP communication session. The session information may include the caller and callee port identifiers identifying a caller port and a callee port respectively through which IP transmissions of the IP communication session to be relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The processor circuit may be further configured to store the session identifier received in the IP transmission in the caller session identifier field in the one of the session information records, when the pre-determined IP transmission is received from the caller, and to store the session identifier received in the IP transmission in the callee session identifier field in the session information record, when the pre-determined IP transmission is received from the callee.

The processor circuit may be further configured to forward the IP transmission to the callee at the callee IP address and callee port identified by the callee IP address identifier and callee port identifier respectively of the session information record, and identify the source of the IP transmission forwarded to the callee with the callee port identifier, when the IP transmission was received at the caller port.

The processor circuit may be further configured to forward the IP transmission to the caller at the caller IP address and caller port identified by the caller IP address identifier and caller port identifier respectively of the session information record, and identify the source of the IP transmission forwarded to the caller with the caller port identifier, when the IP transmission was received at the callee port.

The session identifier may include a synchronization source (SSRC) identifier, the caller session identifier may include a caller SSRC identifier and the callee session identifier may include a callee SSRC identifier.

The IP transmission may contain real time transport protocol (RTP) data and the caller port may be a caller RTP port and the callee port may be a callee RTP port.

In accordance with another aspect, there is provided a media relay apparatus for facilitating uninterrupted transmission of Internet Protocol (IP) transmissions during endpoint changes. The apparatus includes a network interface providing a connection to a network, and a processor circuit in communication with the network interface, the processor circuit including a processor and a non-transitory computer readable medium in communication with the processor. The non-transitory computer readable medium is encoded with codes for directing the processor to define caller and callee ports on the network, and to relay IP transmissions of an IP communication session between a defined caller port and a defined callee port. The codes further include codes for directing the processor to locate a session information record having a caller port identifier or a callee port identifier matching a destination port identifier included in the IP transmission. The caller port identifier identifies the caller port and the callee port identifier identifies the callee port. The codes further include codes for directing the processor to set the source IP address identifier and the source port identifier in the IP transmission as the caller IP address identifier and caller port identifier respectively of the session information record when the destination port identifier in the IP transmission matches the caller port identifier of the session information record, and when a source IP address identifier or a source port identifier in the IP transmission do not match a caller IP address identifier or the caller port identifier respectively of the session information record, and when a session identifier in the IP transmission matches a caller session identifier in the session information record. The codes further include codes for directing the processor to set the source IP address identifier and the source port identifier of the IP transmission as the callee IP address identifier and the callee port identifier respectively of the session information record when the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record.

The non-transitory computer readable medium may be further encoded with codes for directing the processor to maintain the session information records, each record associating session information, caller information and callee information for a respective IP communication session. The session information may include the caller and callee port identifiers identifying a caller port and a callee port respectively of the connection through which IP transmissions of the IP communication session to be relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The non-transitory computer readable medium may be further encoded with codes for directing the processor to store the session identifier received in the IP transmission in the caller session identifier field in the session information record, when the pre-determined IP transmission is received from the caller, and to store the session identifier received in the IP transmission in the callee session identifier field in the one of the session information records, when the pre-determined IP transmission is received from the callee.

The non-transitory computer readable medium may be further encoded with codes for directing the processor to forward the IP transmission to the callee at the callee IP address and callee port identified by the callee IP address identifier and callee port identifier respectively of the session information record, and to identify the source of the IP transmission forwarded to the callee with the callee port identifier, when the IP transmission was received at the caller port.

The non-transitory computer readable medium may be further encoded with codes for directing the processor to forward the IP transmission to the caller at the caller IP address and caller port identified by the caller IP address identifier and caller port identifier respectively of the session information record, and to identify the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data and the caller port may be a caller RTP port and the callee port may be a callee RTP port.

In accordance with another aspect, there is provided a non-transitory computer readable medium encoded with codes for controlling a processor of a media relay apparatus to facilitate uninterrupted transmission of Internet Protocol (IP) transmissions during endpoint changes. The codes are operable to cause the processor to cause the media relay to act as a network interface providing a connection to a network, define caller and callee ports on the network, and relay IP transmissions of an IP communication session between a defined caller port and a defined callee port. The codes are also operable to cause the processor to locate a session information record having a caller port identifier or a callee port identifier matching a destination port identifier included in the IP transmission. The caller port identifier identifies the caller port and the callee port identifier identifies the callee port. The codes are further operable to cause the processor to further set a source IP address identifier and a source port identifier in the IP transmission as a caller IP address identifier and caller port identifier respectively of the session information record when the destination port identifier in the IP transmission matches the caller port identifier of the session information record, and when a source IP address identifier or a source port identifier in the IP transmission do not match the caller IP address identifier or the caller port identifier respectively of the session information record and when a session identifier in the IP transmission matches a caller session identifier in the session information record. The codes further include codes for directing the processor to set the source IP address identifier and the source port identifier of the IP transmission as the callee IP address identifier and the callee port identifier respectively of the session information record when the destination port identifier in the IP transmission matches the callee port identifier of the session information record and when the source IP address identifier or the source port identifier in the IP transmission do not match a callee IP address identifier or the callee port identifier respectively of the session information record and when the session identifier in the IP transmission matches a callee session identifier in the session information record.

The computer readable medium may be further encoded with codes for directing the processor to maintain the session information records, each record associating session information, caller information and callee information for a respective IP communication session. The session information may include the caller and callee port identifiers identifying a caller port and a callee port respectively of the connection through which IP transmissions of the IP communication session are relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The computer readable medium may be further encoded with codes for directing the processor to store the session identifier received in the IP transmission in the caller session identifier field in the session information record, when the pre-determined IP transmission is received from the caller, and store the session identifier received in the IP transmission in the callee session identifier field in the session information record, when the pre-determined IP transmission is received from the callee.

The computer readable medium may be further encoded with codes for directing the processor to forward the IP transmission to the callee at the callee IP address and callee port identified by the callee IP address identifier and callee port identifier respectively of the session information record, and to identify the source of the IP transmission forwarded to the callee with the callee port identifier, when the IP transmission was received at the caller port.

The computer readable medium may be further encoded with codes for directing the processor to forward the IP transmission to the caller at the caller IP address and caller port identified by the caller IP address identifier and caller port identifier respectively of the session information record, and to identify the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data and the caller port may be a caller RTP port and the callee port may be a callee RTP port.

Other aspects and features of the present disclosure will become apparent to those ordinarily skilled in the art upon review of the following description of specific embodiments in conjunction with the accompanying figures.

BRIEF DESCRIPTION OF THE DRAWINGS

In drawings which illustrate embodiments,

FIG. 4 is a schematic representation of an internet protocol (IP) transmission according to the prior art.

FIG. 5 is a tabular representation of the call record shown in FIG. 2 as updated after receipt of an IP transmission at a caller port of the media relay shown in FIG. 1.

FIG. 7 is a tabular representation of the call record as updated after execution of the continuity routine shown in FIG. 6 when a pre-determined packet is received in the IP transmission.

FIG. 8 is a tabular representation of the call record shown in FIG. 7 further updated by the continuity routine after an IP transmission received subsequent to the pre-determined packet is received.

DETAILED DESCRIPTION OF CERTAIN EMBODIMENTS

Figure 1:
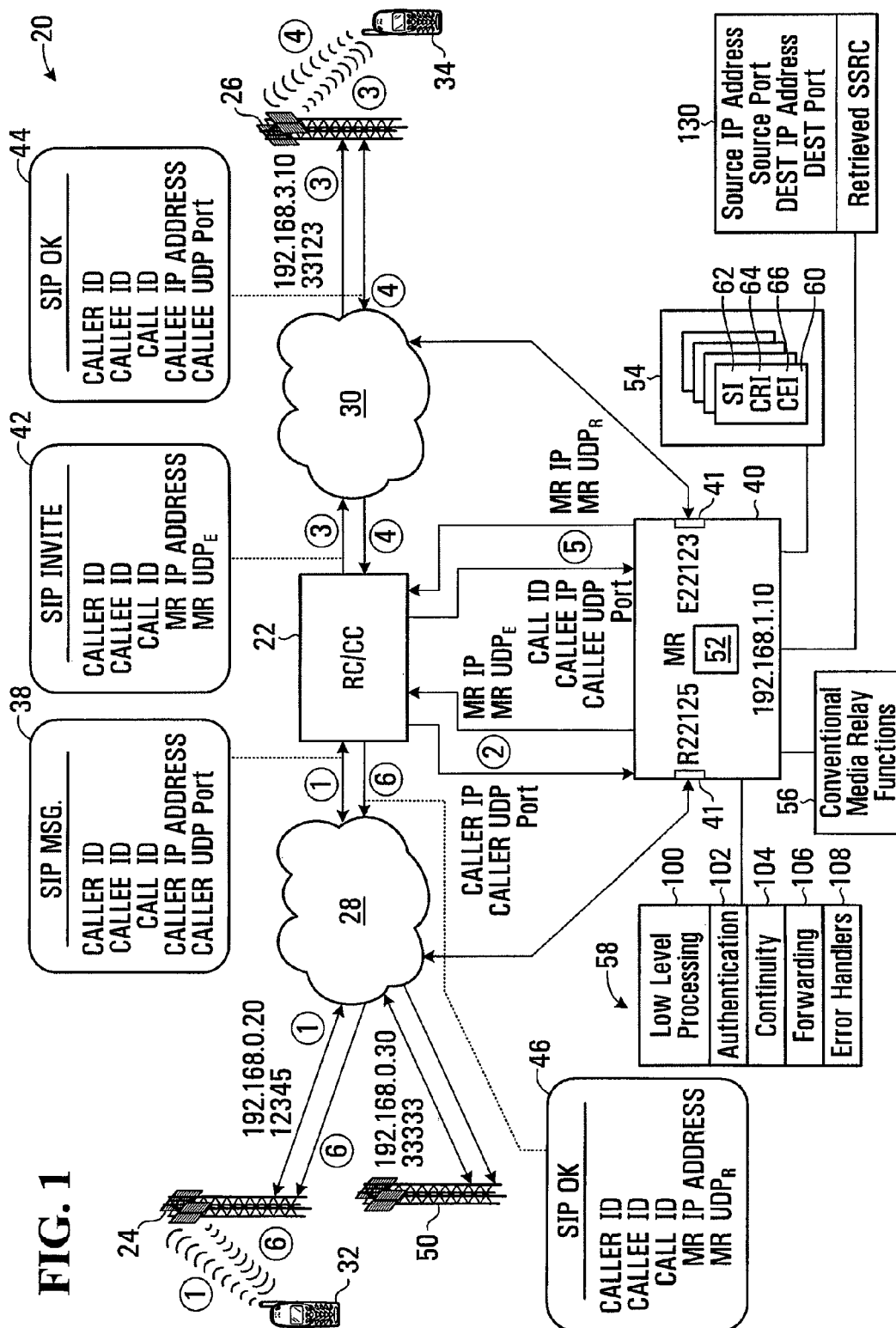
FIG. 1 is a schematic diagram illustrating a system for facilitating uninterrupted transmission of internet protocol (IP) transmissions containing real time transport protocol (RTP) data during endpoint changes, according to a first embodiment.

Referring to FIG. 1, a system for handling voice over internet protocol (IP) transmissions and more generally, IP transmissions, is shown generally at 20. The system 20 includes a routing controller/call controller (RC/CC) system 22 and first, second and third base stations 24, 26 and 50. The base stations 24, 26 and 50 are operable to communicate with the RC/CC 22 via a network or, as shown in this embodiment, separate networks 28 and 30, which in this embodiment depict the internet. The first and second base stations 24 and 26 in this embodiment are operable to communicate with caller and callee mobile telephones 32 and 34 respectively using a cellular wireless network in a conventional manner as is known in the art. The first and second base stations 24 and 26 thus act as "endpoints" for IP transmissions between the caller and callee.

Generally, to establish a call from the caller mobile telephone 32 to the callee mobile telephone 34, the caller mobile telephone transmits to the first base station 24 a session initiation protocol (SIP) message shown generally at 38. The SIP message 38 is transmitted from the caller mobile telephone 32 to the base station 24 and the first base station 24 formats the SIP message 38 into an IP transmission and transmits the IP transmission through the internet 28 to the RC/CC 22. In this embodiment, the first base station 24 is preconfigured with a network IP address 192.168.0.20 and universal datagram protocol (UDP) port 12345.

In response to receipt of the SIP message 38, the RC/CC 22 communicates with a media relay 40 and sends the caller IP address identifier and caller UDP port identifier contained in the SIP message to the media relay 40 to identify the IP address and UDP port to which the media relay 40 should send communications to the first base station 24 for receipt by the caller mobile telephone 32.

The media relay 40 has input/output interfaces 41 in communication with the processor to provide for physical connection to an IP network such as the internet. The media relay 40 is programmed to provide a logical input/output interface that interacts with the input/output interfaces 41 to define caller and callee real time transport protocol (RTP) ports in the conventional manner.

In response, the media relay 40 is configured to send a media relay IP address identifier and media relay RTP port identifier that it associates with the callee identified by the contents of the callee ID field in the SIP message 38. The media relay 40 sends this information to the RC/CC 22 to essentially inform the RC/CC 22 of the media relay IP address identifier and callee RTP port identifier that it should convey to the callee mobile telephone 34 so that the callee telephone can cause IP transmissions to be sent from the second base station 26 to the media relay 40 which can then subsequently forward those transmissions to the caller mobile telephone 32.

In response to receipt of the media relay IP address identifier and the callee RTP port identifier designated by the media relay 40, the RC/CC 22 transmits a SIP invite message 42 through the internet 30 to the callee mobile telephone 34 through the second base station 26. In this embodiment, the second base station 26 has an IP address (192.168.3.10) and a UDP port number (33123). Thus, the RC/CC 22 directs this SIP invite message 42 to the IP address and UDP port associated with the callee mobile telephone 34 by the second base station 26. The second base station 26 then communicates this SIP invite message 42 to the callee mobile telephone 34 over the wireless network and the callee mobile telephone 34 returns a SIP okay message 44 to the second base station 26.

The SIP okay message format is shown at 44 and includes a caller identifier (ID), a callee ID, a call ID, a callee IP address identifier and a callee UDP port identifier. The callee IP address identifier is the IP address of the second base station 26 and the callee UDP port identifier is the UDP port identifier associated with the callee mobile telephone 34 by the second base station 26. The second base station 26 sends the SIP okay message 44 in an IP transmission through the internet 30 to the RC/CC 22 which communicates the call ID, callee IP address identifier, and callee UDP port identifier contained in the SIP okay message 44 to the media relay 40 to identify to the media relay the IP address and UDP port associated with the callee. In response, the media relay 40 sends a reply message to the RC/CC 22 containing a media relay IP address identifier and caller RTP port identifier of a caller RTP port assigned by the media relay, to which the first base station 24 should direct IP transmissions to the media relay for receipt by the callee mobile telephone 34. In this embodiment, this message includes a media relay IP address identifier of 192.168.1.10 and a caller RTP port identifier (R22125).

The RC/CC 22 transmits a SIP okay message 46, having a format as shown, through the internet 28 to the first base station 24 and the first base station communicates the media relay IP address identifier and the caller RTP port identifier associated with the caller to the caller mobile telephone 32.

The above basic communications for establishing a call between the caller and callee mobile telephones 32 and 34 are described in further detail in Applicant's related International Application No. PCT/CA2007/002150. Of interest in connection with the present disclosure is the following way in which the media relay 40 is configured to permit the caller mobile telephone 32 to move to another geographical location in which a handoff occurs between the first base station 24 and the third base station 50 having an IP address identifier and UDP port identifier different from that of the first base station 24.

When a handoff from the first base station 24 to the third base station 50 occurs, the caller mobile telephone 32 ceases communication with the first base station 24 and establishes communication with the third base station 50. However, since the third base station 50 has a different IP address identifier and UDP port identifier than the first base station 24, the media relay 40 will receive IP transmissions from the third base station 50 identifying the source of the transmissions with a different IP address identifier and UDP port identifier than those associated with the first base station. Normally, the media relay 40 would reject such communications as being from an unknown source, however, due to the configuration of the media relay described below, IP transmissions from the third base station 50 are not rejected and the call can continue uninterrupted. To facilitate this, the media relay 40 is configured with additional functionality beyond that which merely relays communications between the caller and callee.

It is known that in general, a media relay 40 includes a processor 52, memory 54 operable to be written to and read by the processor 52, and program memory 56 containing codes readable by the processor 52 that define program instructions for directing the processor 52 to carry out conventional media relay functions for transferring IP transmissions between the caller and the callee. In order to provide the functionality of the present disclosure, in this embodiment, the media relay 40 is further configured with additional codes shown generally at 58 that direct the processor 52 to carry out the functionality described below and include functionality for configuring the memory 54 to include call records 60.

These additional codes 58 may be stored on a computer readable medium such as a CD-ROM, flash drive, or in memory at a remotely located computer and may be downloaded to the program memory 56 or the media relay 40 in a conventional manner, for example.

Figures 2, 3:
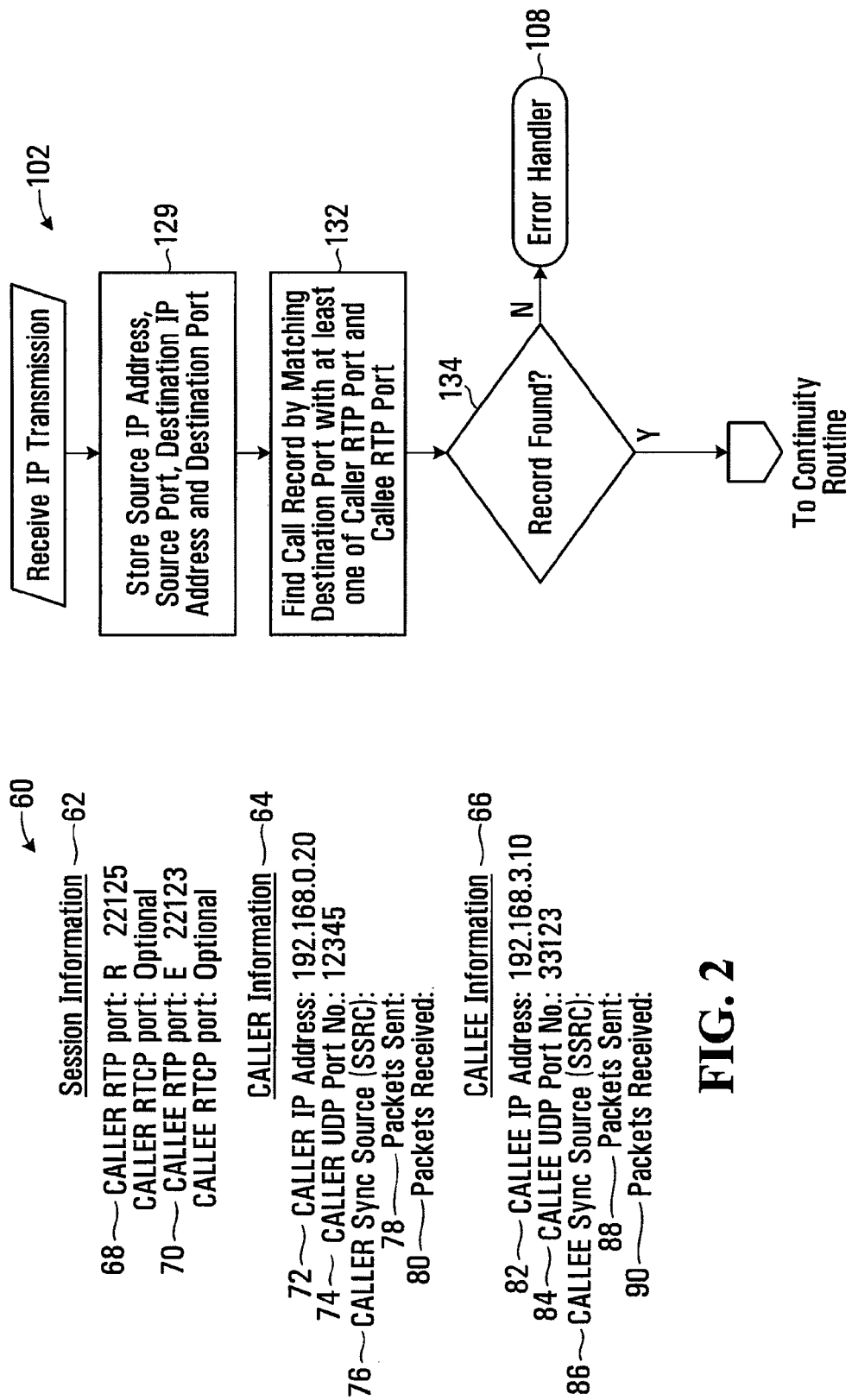
FIG. 2 is a tabular representation of a call record used by the system shown in FIG. 1.
FIG. 3 is a flow chart of an authentication routine executed by a processor of a media relay shown in the system shown in FIG. 1.

Referring to FIG. 2, an exemplary call record is shown generally at 60. Each call record associates session information 62, caller information 64 and callee information 66 for an IP communication session (i.e. call) handled by the media relay 40. The session information 62 includes caller and callee RTP port identifier fields 68 and 70 for storing caller and callee RTP port identifiers identifying caller and callee RTP ports respectively of the media relay 40. In this embodiment, the caller RTP port identifier is R22125 and the callee RTP port identifier is E22123. The session information 62 may also include a caller RTCP port identifier field and a callee RTCP port identifier field, however, these are optional.

The caller information 64 includes a caller IP address identifier field 72 and a caller UDP port identifier field 74 that hold a caller IP address identifier and caller UDP port identifier to which IP transmissions received at the callee RTP port are to be transmitted. In this embodiment, the caller IP address identifier is 192.168.0.20 and the caller UDP port identifier is 12345 and correspond to those of the first base station 24, i.e., that associated with the caller. The caller information 64 further includes a caller sync source (SSRC) identifier field 76 for storing a caller sync source identifier associated with the caller side of the IP communication session. In one embodiment, until a pre-determined packet such as a first packet, for example, is received in connection with the call, this caller SSRC identifier is undefined.

In the embodiment shown, the caller information 64 further includes a packets sent field 78 and a packets received field 80 for holding numbers representing the number of packets sent to and received respectively from the caller although these fields are optional and the contents of these fields may be available from other functions on the media relay 40.

Referring to FIG. 2, the callee information 66 includes a callee IP address identifier field 82 and a callee UDP port identifier field 84 that hold a callee IP address identifier and callee UDP port identifier identifying a callee address and UDP port to which IP transmissions received at the caller RTP port are to be transmitted. In this embodiment, the callee IP address identifier is 192.168.3.10 and the callee UDP port identifier is 33123 and correspond to those of the second base station 26, i.e., that is associated with the callee. The callee information 66 also includes a callee sync source (SSRC) identifier field 86 for storing a callee sync source identifier associated with the callee side of the IP communication session. In one embodiment, this callee SSRC identifier field 86 may be unpopulated until a predefined packet such as the first packet, for example, of the IP transmissions associated with the call is received.

In this embodiment, the callee information 66 also includes a packets sent field 88 and a packets received field 90 for storing numbers indicating the number of packets sent to and received from the caller. The call record 60 is populated with the information shown in FIG. 2 during the course of the normal message exchanges between the RC/CC 22, the caller and callee and the media relay 40 described above that communicate to the caller and callee the media relay IP address and respective RTP port identifiers (R22125 and E22123) to which communications are to be sent.

Referring back to FIG. 1, the additional codes 58 for directing the processor 52 of the media relay 40 to carry out the functions that facilitate uninterrupted transmissions of IP transmissions include codes 100 for effecting a low level processing routine, codes 102 for effecting an authentication routine, codes 104 for effecting a continuity routine, codes 106 for effecting a forwarding routine and codes 108 for effecting error handler routines. The functionality of the low level processing routine codes 100 is not shown but generally relates to processing associated with layers 0 to 4 of the 7 layer ISO IP transmission protocol.

Referring to FIG. 3, the functionality of the authentication routine is shown generally at 102. Before describing this routine, however, please refer to FIG. 4 which describes the generic nature of an IP transmission and the important fields of that transmission for effecting the use of the methods described herein.

In FIG. 4, an IP transmission is shown generally at 110 and includes a PSEUDO header 112, a UDP header 114, a RTP header 116, and a payload 118. The PSEUDO header 112 includes various fields, the most important of which, in this embodiment, are source IP address identifier and destination address identifier fields 120 and 122 respectively. The UDP header 114 includes source port and destination port identifier fields 124 and 126 and the RTP header 116 includes a SSRC identifier field 128. The payload 118 includes data representing, in this embodiment, audio and/or video data transmitted between the caller and the callee.

Referring back to FIG. 3, the authentication routine 102 is executed in response to receipt of an IP transmission 110 at either the caller RTP port R22125 of the media relay 40 or at the callee RTP port E22123 of the media relay. In response to receipt of an IP transmission 110 at either of these ports, the processor 52 of the media relay 40 is directed to store the source IP address contained in the source IP address identifier field 120, the source port identifier contained in the source port identifier field 124, the destination IP address contained in the destination IP address identifier field 122 and the destination port identifier contained in the destination port identifier field 126 in fields by the same name in a buffer memory 130 addressable by the processor 52. The low level processing routine codes 100 will perform the necessary functions to cleanly extract this information and in this embodiment, the storing of this information is effected by the authentication routine 102, as shown at 129. Alternatively, the low level processing routine codes 100 may store this information directly in the buffer memory 130. It will be appreciated that the buffer memory 130 may include separately addressable fields storing the respective information.

Referring to FIG. 5, upon completion of the execution of block 129 or the low level processing routine codes 100, the call record 60 is updated with the number of packets received as shown at 136 where it is indicated that one packet has been received from the callee, for example.

Referring back to FIG. 3, the authentication routine 102 further includes a block 132 that directs the processor 52 to find a call record such as shown at 60 in the memory 54 by matching the destination port identifier with at least one of the contents of the caller RTP port identifier field 68 and the contents of the callee RTP port identifier field 70 of any of the call records. To do this, the codes in block 132 may direct the media relay processor 52 to scan through all of the caller RTP port identifier fields and callee RTP port identifier fields of all of the call records 60 to find a match with the destination port identifier stored in the buffer memory 130.

Referring to FIG. 3, block 134 directs the processor 52 to invoke an error handler as shown at 108 if no record is found and to proceed to execute the code 104 associated with the continuity routine if a record is found.

Figure 6:
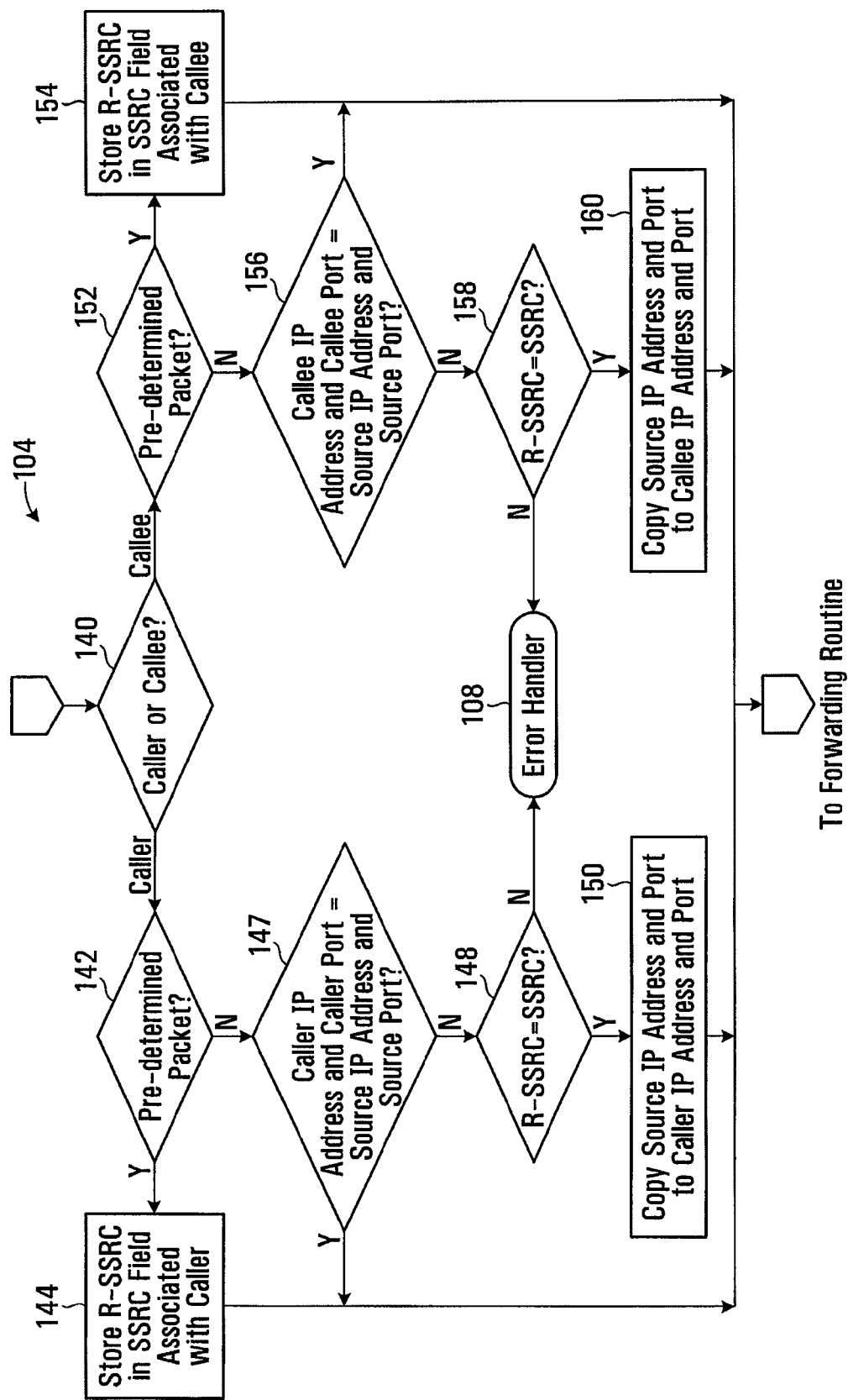
FIG. 6 is a flow chart of a continuity routine executed by the processor of the media relay shown in FIG. 1.

Referring to FIG. 6, the continuity routine 104 begins with a first block 140 which directs the processor 52 to determine whether or not the IP transmission 110 has been received at the caller RTP port or the callee RTP port.

The identification of whether or not the IP transmission 110 is from the caller or callee can occur in a number of ways. One way, for example, is for the processor 52 to be responsive to interrupt signals that may be produced by the input/output interface circuitry 41 that physically implements the interface between the media relay 40 and the internet. Since the caller RTP port and callee RTP port have different port identifiers, the input/output interface circuitry 41 may identify the port which has received an IP transmission 110 and cause an interrupt signal and perhaps an interrupt handler (not shown) to be executed by the processor 52 in order to identify the specific port which has received the IP transmission 110.

Alternatively, when the processor 52 identifies the call record 60 by matching the destination port identifier received from the IP transmission 110 with at least one of the caller RTP port identifier and callee RTP port identifier in a call record, the matching RTP port identifier is inherently identified and this information can be used to identify the specific port that has received the IP transmission 110. A flag (not shown) may be set for example, to identify whether the IP transmission 110 is from the caller or callee, depending on whether there is a match of the destination port identifier with the callee or caller RTP identifier. Thus, if there is a match of the destination port identifier with the callee RTP port identifier, then the source must be the caller and if there is a match of the destination port identifier with the caller RTP port identifier, then the source must be the callee.

Thus, if a flag is used, block 140 can simply cause the processor 52 to read the flag to determine whether or not the IP transmission 110 is received from the caller or callee.

Assuming the IP transmission 110 is received from the caller, optionally, block 142 can direct the processor 52 to determine whether or not a pre-determined packet has been received. In this embodiment, the pre-determined packet is the first packet and thus can be determined by simply reading the contents of the packets received field 80 in the caller information 64 of the call record 60 identified at block 132 of the authentication routine 102. Alternatively, the low level processing codes 100 may have previously stored the number of packets received in some other location readable by the processor 52 for use at this stage.

In this embodiment, the first packet received from the caller is the pre-determined packet and thus, when the first packet is received, block 144 directs the processor 52 to store the SSRC identifier received in the IP transmission 110 in the caller SSRC field 76 associated with the caller information 64 of the call record 60 as shown at 146 in FIG. 7. The processor 52 is then directed to the forwarding routine 106. If at block 142, the IP transmission 110 includes a packet that is not the pre-determined packet, in particular, a packet received subsequent to the pre-determined packet, or where there will be no determination as to whether the received packet is a pre-determined packet, block 147 directs the processor 52 to determine whether the caller IP address identifier and caller port identifier in the caller information 64 of the call record 60 match the source IP address identifier and source port identifier received in the IP transmission 110. If so, the IP transmission 110 has been received from the pre-established source (in this embodiment, the first base station 24) and therefore, the processor 52 is directed to the forwarding routine 106.

If at block 147 the caller IP address identifier and caller port identifier do not match the source IP address identifier and source port identifier, then the IP transmission 110 is deemed to be originating from a different source (i.e. the third base station 50) in which case block 148 directs the processor 52 to determine whether or not the IP transmission is associated with the call represented by the call record 60. To do this, block 148 directs the processor 52 to determine whether the SSRC identifier received in the IP transmission 110 matches the caller SSRC identifier stored in the caller sync source field 76 of the call record 60 shown in FIG. 7. If not, the processor 52 is directed to an error handling routine 108.

If the SSRC received in the IP transmission 110 matches the caller SSRC stored in the caller sync source field 76 of the call record 60, block 150 directs the processor 52 to copy the source IP address identifier and source port identifier respectively to the caller IP address identifier and caller UDP port identifier fields 72 and 74 respectively of the call record 60 to update the call record to identify the IP address and UDP port of the third base station 50 as that of the caller, as shown in FIG. 8. The processor 52 is then directed to the call forwarding routine 106.

Thus, in an IP transmission 110 received subsequent to the pre-determined transmission, or where there is no determination of whether the transmission is a pre-determined one, the source IP address identifier and source port identifier from the IP transmission 110 are set as the caller IP address identifier and caller port identifier respectively of the call record 60 when the caller IP address identifier and caller port identifier of the record do not match the source IP address identifier and source port identifier respectively of the IP transmission 110 and the received SSRC in the IP transmission matches the caller SSRC identifier of the call record.

Similarly, blocks 152, 154, 156, 158, and 160 function to perform similar functionality when the destination port identifier in the IP transmission 110 matches the callee RTP port identifier of the identified call record 60. In this case where there is a determination of whether the transmission is a pre-determined one, if the IP transmission is the pre-determined transmission, the SSRC identifier received in the IP transmission 110 is set as the callee SSRC identifier associated with the callee information 66 of the record 60 and if the IP transmission is received subsequent to the pre-determined transmission, or where there is no determination of whether the transmission is a pre-determined one, the source IP address identifier and source port identifier from the IP transmission are set as the callee IP address identifier and callee port identifier respectively of the record when the callee IP address identifier and callee port identifier do not match the source IP address identifier and source port identifier respectively and the received SSRC identifier in the IP transmission matches the callee SSRC identifier.

Figure 9:
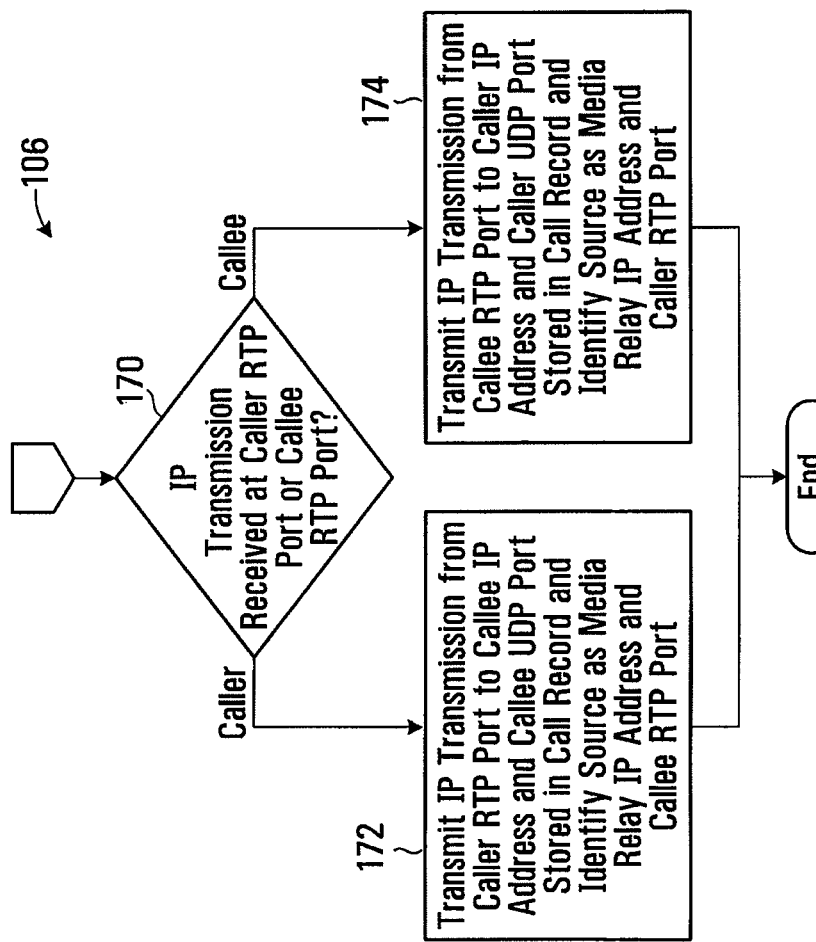
FIG. 9 is a flow chart of a forwarding routine executed by the processor of the media relay shown in FIG. 1 to relay the received IP transmission to a caller or callee with a source identification provided by the call record as updated by the continuity routine shown in FIG. 6.

Referring to FIG. 9, the forwarding routine is shown generally at 106. The forwarding routine includes a first block 170 that directs the processor 52 to again determine whether or not the IP transmission 110 has been received at the caller RTP port or callee RTP port. Again, this may be determined by reading the flag described above or by simply reading a memory location identifying the RTP port that received the IP transmission 110.

If the IP transmission 110 has been received at the caller RTP port, block 172 directs the processor 52 to transmit the IP transmission from the caller RTP port to the callee IP address and callee UDP port identified by the callee IP address identifier and callee UDP port identifier in the call record 60 and to identify the source IP address and source port of the IP transmission as the media relay IP address and callee RTP port. If on the other hand, the IP transmission 110 was received at the callee RTP port, block 174 directs the processor 52 to transmit the IP transmission from the callee RTP port to the caller IP address identified by the caller IP address identifier and caller UDP port identifier stored in the call record 60 and identify the source IP address and source port of the IP transmission as the media relay IP address and caller RTP port. The IP transmission 110 received at either port is thus relayed by the media relay 40 according to the contents of the call record 60 as previously established by the continuity routine 104 shown in FIG. 6.

It will be appreciated that in this embodiment, the IP transmissions 110 received from the caller and from the callee may have different SSRC identifiers. Alternatively, they may have the same SSRC identifiers.

What is claimed is:

1. A method of facilitating an uninterrupted internet protocol (IP) communication session involving internet protocol transmissions between a first entity and a second entity, during endpoint changes, the method comprising:
    maintaining records, each record associating communication session information, first entity information and second entity information for a respective IP communication session conducted through a media relay, wherein:
        the communication session information includes first and second relay port identifiers identifying a first relay port and a second relay port respectively of the media relay through which IP transmissions of the IP communication session are relayed;
        the first entity information includes a first entity IP address identifier and a first entity port identifier to which IP transmissions received at the second relay port are transmitted from the media relay, and a first entity session identifier, and
        the second entity information includes a second entity IP address identifier and a second entity port identifier to which IP transmissions received at the first relay port are transmitted from the media relay, and a second entity session identifier; and
    when an IP transmission is received at the first relay port or the second relay port:
        locating one of the records having the first relay port identifier or the second relay port identifier matching a destination port identifier in the IP transmission; and
        when the one record is located and when the destination port identifier matches the first relay port identifier of the one record:
            setting a source IP address identifier and a source port identifier from the IP transmission as the first entity IP address identifier and first entity port identifier respectively of the one record when:
                the first entity IP address identifier and first entity port identifier do not match the source IP address identifier and the source port identifier respectively; and
                a received IP session identifier in the IP transmission matches the first entity session identifier; and
        when the one record is located and when the destination port identifier matches the second relay port identifier of the one record:
            setting the source IP address identifier and the source port identifier from the IP transmission as the second entity IP address identifier and second entity port identifier respectively of the one of the records when:
                the second entity IP address identifier and second entity port identifier do not match the source IP address identifier and the source port identifier respectively; and
                the received IP session identifier in the IP transmission matches the second entity session identifier.

2. The method of claim 1, further comprising determining whether the IP transmission is a pre-determined transmission and, if so:
    when the pre-determined IP transmission is received from the first entity:
        storing the received IP session identifier as the first entity session identifier in the record; and
    when the pre-determined IP transmission is received from the second entity:
        storing the received IP session identifier as the second entity session identifier in the record.

3. The method of claim 1, further comprising determining whether the IP transmission is a pre-determined transmission and, if so:
    where the first entity and second entity use a same entity session identifier, storing the received IP session identifier as the first entity session identifier and as the second entity session identifier in the record.

4. The method of claim 1, further comprising:
    when the IP transmission is received at the first relay port, causing the media relay to forward the IP transmission to the second entity at a second entity IP address and a second entity port identified by the second entity IP address identifier and the second entity port identifier of the record and identifying a source of the IP transmission forwarded to the second entity with the second relay port identifier; and
    when the IP transmission is received at the second relay port, causing the media relay to forward the IP transmission to the first entity at a first entity IP address and a first entity port identified by the first entity IP address identifier and the first entity port identifier of the record and identifying a source of the IP transmission forwarded to the first entity with the first relay port identifier.

5. A media relay apparatus configured to facilitate uninterrupted transmission of internet protocol (IP) transmissions between a first entity and a second entity during endpoint changes, the apparatus comprising:
    a processor;

a network interface in communication with the processor to provide a connection to an IP network;
a program memory and a storage memory, the program memory encoded with computer executable codes for directing the processor to:
provide a logical input/output interface interacting with the network interface to define a first relay port and a second relay port;
maintain records in the storage memory, each of the records having fields associating session information, first entity information and second entity information for a respective IP communication session between the first and second entities wherein:
the fields associating session information includes first and second relay port identifier fields identifying the first relay port and the second relay port respectively, through which IP transmissions of the IP communication session are relayed;
the first entity information includes a first entity IP address identifier field and a first entity port identifier field to which IP transmissions received at the second relay port are to be transmitted, and a first entity session identifier field; and
the second entity information includes a second entity IP address identifier field and a second entity port identifier field to which IP transmissions received at the first relay port are to be transmitted, and a second entity session identifier field;
locate one of the records having first relay port identifier field contents or second relay port identifier field contents matching a destination port identifier in the IP transmission when an IP transmission is received at the first relay port or the second relay port; and
when the one record is located and when the destination port identifier in the IP transmission matches the first relay port identifier field contents of the one record:
storing a source IP address identifier and source port identifier from the IP transmission in the first entity IP address identifier field and the first entity port identifier field respectively when:
contents of the first entity IP address field and contents of the first entity port identifier field do not match the source IP address identifier and the source port identifier respectively; and
a received IP session identifier in the IP transmission matches contents of the first entity session identifier field;
when the one record is located and when the destination port identifier in the IP transmission matches the contents of the second relay port identifier field of the one record,
storing the source IP address identifier and the source port identifier from the IP transmission in the second entity IP address identifier field and the second entity port identifier field respectively when:
contents of the second entity IP address identifier field and contents of the second entity port identifier field do not match the source IP address identifier and the source port identifier respectively; and
the received IP session identifier in the IP transmission matches contents of the second entity session identifier field.

6. The apparatus of claim 5, wherein the program memory is further encoded with computer executable codes for directing the processor to:
determine whether the IP transmission is a pre-determined transmission and, if so:
when the pre-determined IP transmission is received from the first entity:
store the received IP session identifier in the first entity session identifier field in the one record; and
when the pre-determined IP transmission is received from the second entity:
store the received IP session identifier in the second entity session identifier field in the one record.

7. The apparatus of claim 5, wherein the program memory is further encoded with computer executable codes for directing the processor to:
determine whether the IP transmission is a pre-determined transmission and, if so:
where the first entity and second entity are configured to use a same session identifier, store the received IP session identifier in the first entity session identifier field and in the second entity session identifier field in the one record.

8. The apparatus of claim 5, wherein the program memory is further encoded with computer executable codes for directing the processor to:
when the IP transmission is received at the first relay port:
forward the IP transmission to the second entity identified by the contents of the second entity IP address identifier field and the contents of the second entity port identifier field and identify a source of the IP transmission according to the contents of the second relay port identifier field; and
when the IP transmission is received at the second relay port,
forward the IP transmission to the first entity identified by the contents of the first entity IP address identifier field and the contents of the first entity port identifier field and identify a source of the IP transmission according to the contents of the first relay port identifier field.

9. A media relay apparatus configured to facilitate uninterrupted transmission of internet protocol (IP) transmissions between a first entity and a second entity during endpoint changes, the apparatus comprising:
a processor;
physical connection means for providing physical connections between the processor and an IP network;
means for interacting with the physical connection means and the processor for providing a network interface defining first and second relay ports;
means for maintaining records in memory, each of the records having means for associating session information, first entity information and second entity information for a respective IP communication session including:
means for storing first and second relay port identifiers identifying a first relay port and a second relay port respectively of the network interface, through which IP transmissions of the IP communication session are relayed;
means for storing a first entity IP address identifier and a first entity port identifier identifying a first entity port to which IP transmissions received at the second relay port are to be transmitted from the media relay apparatus;
means for storing a first entity session identifier;

means for storing a second entity IP address identifier and a second entity port identifier identifying a second entity port to which IP transmissions received at the first relay port are to be transmitted from the media relay apparatus; and
means for storing a second entity session identifier; and
means for locating one of the records having a first relay port identifier or a second relay port identifier matching a destination port identifier in an IP transmission when the IP transmission is received at a first relay port or a second relay port;
means for determining whether the destination port identifier in the IP transmission matches the first relay port identifier of the one record;
means for setting the first entity IP address identifier and the first entity port identifier as a source IP address identifier and a source port identifier respectively from the IP transmission when:
the first entity IP address identifier and first entity port identifier do not match the source IP address identifier and the source port identifier respectively; and
a received IP session identifier in the IP transmission matches the first entity session identifier;
means for determining whether the destination port identifier in the IP transmission matches the second relay port identifier of the one record;
means for setting the second entity IP address identifier and the second entity port identifier as the source IP address identifier and the source port identifier respectively from the IP transmission when:
the second entity IP address identifier and the second entity port identifier do not match the source IP address identifier and the source port identifier respectively; and
the received IP session identifier in the IP transmission matches the second entity session identifier.

10. The apparatus of claim 9, further comprising:
means for determining whether the IP transmission is a pre-determined transmission, and if so:
means for storing the received IP session identifier as the first entity session identifier when the pre-determined IP transmission is received from the first entity; and
means for storing the received IP session identifier as the second entity session identifier when the pre-determined IP transmission is received from the second entity.

11. The apparatus of claim 9, further comprising means for determining whether the IP transmission is a pre-determined transmission and means for storing the received session identifier as the first entity session identifier and as the second entity session identifier, when the first entity and second entity use a same session identifier.

12. The apparatus of claim 9, further comprising:
means for forwarding the IP transmission to the second entity identified by the second entity IP address identifier and the second entity port identifier and for identifying a source of the IP transmission with the second relay port identifier when the received IP transmission was received at the first relay port; and
means for forwarding the IP transmission to the first entity identified by the first entity IP address identifier and first entity port identifier and for identifying a source of the IP transmission with the first relay port identifier when the received IP transmission was received at the second relay port.

13. A non-transitory computer readable medium encoded with computer executable codes for directing a processor of a media relay configured to facilitate uninterrupted transmission of internet protocol (IP) transmissions between first and second entities during endpoint changes, the codes comprising computer executable codes for directing the processor to:
maintain records, each record associating session information, first entity information and second entity information for a respective IP communication session,
the session information including first and second relay port identifiers identifying a first relay port and a second relay port respectively of the media relay, through which IP transmissions of the IP communication session are relayed,
the first entity information including a first entity IP address identifier and a first entity port identifier to which IP transmissions received at the second relay port are transmitted from the media relay, and a first entity session identifier, and
the second entity information including a second entity IP address identifier and a second entity port identifier to which IP transmissions received at the first relay port are transmitted from the media relay, and a second entity session identifier; and
when an IP transmission is received at the first relay port or the second relay port:
locate one of the records having the first relay port identifier or the second relay port identifier matching a destination port identifier in the IP transmission; and
when the one record is located and when the destination port identifier in the IP transmission matches the first relay port identifier of the one record:
set a source IP address identifier and a source port identifier from the IP transmission as the first entity IP address identifier and the first entity port identifier respectively of the one of the records when:
the first entity IP address identifier and first entity port identifier do not match the source IP address identifier and the source port identifier respectively; and
a received IP session identifier in the IP transmission matches the first entity session identifier, and
when the one record is located and when the destination port identifier in the IP transmission matches the second relay port identifier of the one record:
set the source IP address identifier and the source port identifier from the IP transmission as the second entity IP address identifier and the second entity port identifier respectively of the one record when:
the second entity IP address identifier and the second entity port identifier do not match the source IP address identifier and the source port identifier respectively; and
the received IP session identifier in the IP transmission matches the second entity session identifier.

14. The computer readable medium of claim 13, further comprising computer executable codes for directing the processor to:
store the received IP session identifier as the first entity session identifier in the one record when the IP transmission is a pre-determined transmission and the predetermined IP transmission is from the first entity; and
store the received IP session identifier as the second entity session identifier in the one record when the IP transmission is a pre-determined transmission and the predetermined IP transmission is from the second entity.

15. The computer readable medium of claim 13, further comprising computer executable codes for directing the processor to store the received IP session identifier as the first entity session identifier and as the second entity session identifier in the one record when the IP transmission is a pre-determined transmission and the first entity and second entity are configured to use a same session identifier.

16. The computer readable medium of claim 13, further comprising computer executable codes for directing the processor to:
cause the media relay to forward the IP transmission to the second entity at a second entity IP address and a second entity port identified by the second entity IP address identifier and second entity port identifier respectively and identify a source of the IP transmission forwarded to the second entity with the second relay port identifier, when the IP transmission was received at the first relay port; and
cause the media relay to forward the IP transmission to the first entity at a first entity IP address and a first entity port identified by the first entity IP address identifier and the first entity port identifier respectively and identify the source of the IP transmission forwarded to the first entity with the first relay port identifier, when the IP transmission was received at the second relay port.

17. A method of facilitating an uninterrupted internet protocol (IP) communication session involving internet protocol transmissions, between a first entity and a second entity, during endpoint changes, the method comprising:
conducting IP transmissions, of the IP communication session, to and from the first entity through a first relay port;
conducting IP transmissions, of the IP communication session, to and from the second entity, through a second relay port;
relaying, between the first and second relay ports, IP transmissions, of the IP communication session, between the first and second entities;
when an IP transmission is received at the first relay port or the second relay port:
locating at least one communication record associated with the IP communication session with which the IP transmission is associated, by locating at least one communication record having a first relay port identifier or a second relay port identifier matching a destination port identifier in the IP transmission; and
when the at least one communication record is located and when the destination port identifier in the IP transmission matches the first relay port identifier of the at least one communication record:
changing the at least one communication record such that a first entity IP address identifier and a first entity port identifier of the at least one communication record indicates a source IP address identifier and a source port identifier from the IP transmission respectively when:

the first entity IP address identifier and first entity port identifier do not match the source IP address identifier and the source port identifier respectively; and
an IP communication session identifier in the IP transmission matches a first entity session identifier associated with the at least one communication record; and
when the at least one communication record is located and when the destination port identifier in the IP transmission matches the second relay port identifier of the at least one communication record:
changing the at least one communication record such that a second entity IP address identifier and a second entity port identifier of the at least one communication record indicates the source IP address identifier and the source port identifier from the IP transmission respectively, when:
the second entity IP address identifier and second entity port identifier do not match the source IP address identifier and the source port identifier respectively; and
the IP communication session identifier in the IP transmission matches a second entity session identifier associated with the at least one communication record.

18. An apparatus configured to facilitate uninterrupted transmission of internet protocol (IP) transmissions between first and second entities during endpoint changes, the apparatus comprising:
means for conducting communications to and from a first entity through a first network port;
means for conducting communications to and from a second entity through a second network port;
means for relaying, between the first and second network ports, causing communications between the first and second entities;
means for locating at least one communication record associated with a communications session with which the IP transmission is associated, the locating means including means for finding at least one communication record having a first network port identifier or a second network port identifier matching a destination port identifier in the IP transmission when an IP transmission is received at the first network port or the second network port;
means for changing the at least one communication record such that a first entity IP address identifier and a first entity port identifier respectively of the at least one communication record indicates a source IP address identifier and a source port identifier from the IP transmission when:
the at least one communication record is located and when the destination port identifier in the IP transmission matches the first network port identifier of the at least one communication record,
the first entity IP address identifier and the first entity port identifier do not match the source IP address identifier and the source port identifier respectively; and
a received IP session identifier in the IP transmission matches a first session entity identifier associated with the at least one communication record; and
means for changing the at least one communication record such that a second entity IP address identifier and a second entity port identifier respectively of the at least one communication record indicates the source IP address identifier and the source port identifier from the IP transmission, when:
- the at least one communication record is located and when the destination port identifier in the IP transmission matches the second network port identifier of the at least one communication record,
- the second entity IP address identifier and second entity port identifier do not match the source IP address identifier and the source port identifier respectively; and
- the received IP session identifier in the IP transmission matches a second entity session identifier associated with the at least one communication record.

19. An apparatus configured to facilitate uninterrupted transmission of internet protocol (IP) transmissions between first and second entities during endpoint changes, the apparatus comprising:
- a processor circuit configured to:
  - cause communications to and from the first entity to be conducted through a first network port;
  - cause communications to and from the second entity to be conducted through a second network port;
  - cause communications between the first and second entities to be relayed between the first and second network ports;
  - locate at least one communication record associated with a communications session with which the IP transmission is associated, when an IP transmission is received at the first network port or the second network port, the locating including finding at least one communication record having a first network port identifier or a second network port identifier matching a destination port identifier in the IP transmission; and
  - when the at least one communication record is located and when the destination port identifier in the IP transmission matches the first network port identifier of the at least one communication record:
    change the at least one communication record such that a first entity IP address identifier and first entity port identifier respectively of the at least one communication record indicate a source IP address identifier and a source port identifier from the IP transmission when:
    - the first entity IP address identifier and the first entity port identifier do not match the source IP address identifier and the source port identifier respectively; and
    - a received IP session identifier in the IP transmission matches a first entity session identifier associated with the at least one communication record;
  - when the at least one communication record is located and when the destination port identifier in the IP transmission matches a second network port identifier of the at least one communication record,
    change the at least one communication record such that a second entity IP address identifier and a second entity port identifier respectively of the at least one communication record indicates the source IP address identifier and the source port identifier from the IP transmission, when:
    - the second entity IP address identifier and the second entity port identifier do not match the source IP address identifier and the source port identifier respectively; and
    - the received IP session identifier in the IP transmission matches a second entity session identifier associated with the at least one communication record.

20. The apparatus of claim 19, wherein the processor circuit is part of a media relay.

* * * * *